US012576690B2

(12) United States Patent　　　(10) Patent No.:　US 12,576,690 B2
Baerentz　　　　　　　　　　　　(45) Date of Patent:　Mar. 17, 2026

(54) REEFER POWER CONTROL

(71) Applicant: Maersk Line A/S, Copenhagen (DK)

(72) Inventor: Morten Rene Baerentz, Liseleje (DK)

(73) Assignee: Maersk Line A/S, Copenhagen (DK)

( * ) Notice: Subject to any disclaimer, the term of this patent is extended or adjusted under 35 U.S.C. 154(b) by 402 days.

(21) Appl. No.: 17/566,424

(22) Filed: Dec. 30, 2021

(65) Prior Publication Data

US 2022/0118815 A1　　Apr. 21, 2022

Related U.S. Application Data

(63) Continuation of application No. PCT/EP2020/069462, filed on Jul. 9, 2020.

(30) Foreign Application Priority Data

Jul. 10, 2019　(GB) ...................................... 1909935

(51) Int. Cl.
B60H 1/00　　　　(2006.01)
B63B 79/15　　　　(2020.01)
(Continued)

(52) U.S. Cl.
CPC ........... B60H 1/0073 (2019.05); B63B 79/15 (2020.01); B63B 79/40 (2020.01); B63H 21/30 (2013.01);
(Continued)

(58) Field of Classification Search
CPC .............. B60H 1/0073; B60H 1/00428; B60H 2001/00733; B60H 1/00014; B63B 79/15;
(Continued)

(56) References Cited

U.S. PATENT DOCUMENTS 4,268,787 A　　5/1981　Sloan
6,191,500 B1　　2/2001　Toy
(Continued)

FOREIGN PATENT DOCUMENTS

CN　　101053136 A　　10/2007
CN　　101795935 A　　8/2010
(Continued)

OTHER PUBLICATIONS

Claus Bonefeld, Method for the operation of a vessel, and vessel having a propulsion system with waste heat recovery.2008) (Year: 2008).*

(Continued)

*Primary Examiner* — Abby J Flynn
*Assistant Examiner* — Bakari Underwood
(74) *Attorney, Agent, or Firm* — Fish & Richardson P.C.

(57)　　　　　　　ABSTRACT

Disclosed is a power controller for controlling power to be supplied to at least one reefer container on a container vessel. The power controller is configured to obtain a set temperature for at least one reefer container to be transported by the container vessel. The power controller is also configured to obtain data that indicates an amount of energy available to the container vessel and determine, based on the amount of energy available to the container vessel, whether to cool the at least one reefer container below the set temperature.

16 Claims, 9 Drawing Sheets

(51) Int. Cl.

| | |
|---|---|
| *B63B 79/40* | (2020.01) |
| *B63H 21/30* | (2006.01) |
| *B63H 21/32* | (2006.01) |

(52) U.S. Cl.
CPC ......... *B63H 21/32* (2013.01); *B60H 1/00428* (2013.01); *B60H 2001/00733* (2019.05)

(58) Field of Classification Search
CPC ......... B63B 79/40; B63B 25/26; B63H 21/30; B63H 21/32; F25D 29/003; F25D 11/003; H02J 2310/42; H02J 3/14; B60P 3/20; B63J 3/04; B63J 3/02; B63J 2003/00
See application file for complete search history.

(56) References Cited

U.S. PATENT DOCUMENTS

| | | | |
|---|---|---|---|
| 6,652,330 B1 | 11/2003 | Wasilewski | |
| 10,826,293 B1 | 11/2020 | Metcalf | |
| 11,034,213 B2 | 6/2021 | Wenger et al. | |
| 11,072,321 B2 | 7/2021 | Wenger et al. | |
| 11,420,495 B2 | 8/2022 | Schumacher et al. | |
| 11,458,802 B2 | 10/2022 | Andrade et al. | |
| 11,695,275 B2 | 7/2023 | Schumacher et al. | |
| 2004/0020236 A1 | 2/2004 | Vince et al. | |
| 2014/0343741 A1* | 11/2014 | Clarke | F25D 11/003 |
| | | | 700/291 |
| 2017/0292759 A1 | 10/2017 | Al-Hallaj et al. | |
| 2018/0029436 A1* | 2/2018 | Zaeri | B60H 1/004 |
| 2022/0111699 A1* | 4/2022 | Hofsdal | B60H 1/3205 |
| 2022/0118815 A1 | 4/2022 | Baerentz | |

FOREIGN PATENT DOCUMENTS

| | | | | | |
|---|---|---|---|---|---|
| CN | 102246378 | A | 11/2011 | | |
| CN | 102506476 | A | 6/2012 | | |
| CN | 103178533 | A | 6/2013 | | |
| CN | 103999100 | A | 8/2014 | | |
| CN | 104884773 | A | 9/2015 | | |
| CN | 105353611 | A | 2/2016 | | |
| CN | 206377904 | U | 8/2017 | | |
| CN | 107636928 | A | 1/2018 | | |
| CN | 109844429 | A | 6/2019 | | |
| CN | 109844430 | A | 6/2019 | | |
| CN | 109995182 | A | 7/2019 | | |
| DE | 102016104890 | A1 * | 9/2017 | ........... | F25D 11/003 |
| EP | 2886442 | B1 | 10/2018 | | |
| JP | S61256167 | A | 11/1986 | | |
| JP | 2010141998 | A | 6/2010 | | |
| JP | 2011149685 | A | 8/2011 | | |
| JP | 2014153022 | A | 8/2014 | | |
| JP | 2014228165 | A | 12/2014 | | |
| JP | 2019093735 | A | 6/2019 | | |
| KR | 1020150102583 | A | 9/2015 | | |
| KR | 20170053740 | A | 5/2017 | | |
| KR | 1020190048822 | A | 5/2019 | | |
| KR | 102155422 | B1 * | 9/2020 | ............... | H02J 1/12 |
| WO | WO-2008025688 | A1 * | 3/2008 | ........... | B63H 21/20 |
| WO | 2012107977 | A1 | 8/2012 | | |
| WO | 2012175624 | A1 | 12/2012 | | |
| WO | 2013077495 | A1 | 5/2013 | | |
| WO | 2013139640 | A1 | 9/2013 | | |
| WO | 2014125766 | A1 | 8/2014 | | |
| WO | 2017125359 | A1 | 7/2017 | | |
| WO | 2018005968 | A1 | 1/2018 | | |

OTHER PUBLICATIONS

"Toufik Ibrahimi, Solar Cooling Container, Sep. 21, 2017" (Year: 2017).*

"Ship applied with low-voltage distribution" (Year: 2020).*

United Kingdom Search Report dated Jan. 13, 2020 for GB Application No. GB1909934.0.

International Search Report and Written Opinion dated Oct. 9, 2020 for PCT Application No. PCT/EP2020/069461.

United Kingdom Combined Search and Examination report dated Jan. 7, 2020 for GB Application No. GB1909935.7.

International Search Report and Written Opinion dated Oct. 12, 2020 for PCT Application No. PCT/EP2020/069462.

Notice of Preliminary Rejection Non-Final Office Action dated Aug. 28, 2023 for Korean Patent Application No. 10-2022-7000797.

Notice of Preliminary Rejection Non-Final Office Action dated Aug. 28, 2023 for Korean Patent Application No. 10-2022-7000795.

Notice of Allowance dated Sep. 1, 2023 for U.S. Appl. No. 17/566,392.

Chinese Office Action dated Jul. 2, 2024 for Chinese Application No. 202080049922.5.

* cited by examiner

600

610
Obtain a set temperature for at least one reefer container to be transported by a container vessel 620
Obtain data that indicates an amount of energy available to the container vessel 630
Determine, based on the determined amount of energy available to the container vessel, whether to cool the at least one reefer container below the set temperature

REEFER POWER CONTROL

CROSS-REFERENCE TO RELATED APPLICATIONS

This application is a continuation of International Application No. PCT/EP2020/069462, filed Jul. 9, 2020, which claims priority to United Kingdom Application No. GB 1909935.7 filed Jul. 10, 2019, under 35 U.S.C. § 119(a). Each of the above-referenced patent applications is incorporated by reference in its entirety.

BACKGROUND

Field of the Invention

The present invention relates to a power controller and a power control system for controlling power to be supplied to at least one reefer container on a container vessel, and an associated method.

Description of the Related Technology

Container vessels play an important role in transporting cargo around the world. As cargo ships, container vessels carry their load in intermodal containers which are designed to be moved from one mode of transport to another, e.g. without unloading and reloading, in a technique called "containerization". The standard (ISO) intermodal container is designated as twenty feet (6.10 m) long and 8 feet (2.44 m) wide, leading to the twenty-foot equivalent unit (TEU) as a unit of cargo capacity often used to describe the capacity of container vessels and terminals. Typical loads on a container vessel are a mix of 20-foot and 40-foot (2-TEU) ISO containers. Most non-bulk cargo worldwide is transported by container vessels, with a majority of the world's container volume made up of 2-TEU containers. The largest modern container ships have capacities over 21,000 TEU.

A container vessel will typically have an onboard generator, also called an "engine-generator set" or a "gen-set", which may be used to provide electrical power to components of the container vessel. The generator may include an electrical generator combined with an engine. For example, a diesel generator may be a combination of a diesel engine with an electric generator (e.g. an alternator) together operable to generate electrical energy. The generated electrical energy is typically supplied to a vessel component, via a combination of an electric current and an electric potential, by an electrical circuit (e.g. an electric power system or utility) onboard the vessel. Electric power is then a rate, per unit time, at which the electrical energy is transferred by the electric circuit to the component. The SI unit of power is the watt (W), equivalent to one joule per second, however electric power supply is typically measured by the kilowatt hour (kWh) which is the product of the electric power in kilowatts and a running time of the supply in hours. The kilowatt hour is thus a unit of energy and is equivalent to 3.6 mega joules (MJ) in SI units.

The container vessel components powered by the generator can include thrusters, e.g. comprising propellers laterally mounted on the container vessel that can suck or blow water to manoeuvre the container vessel. The container vessel may have onboard pumps, e.g. marine pumps, for displacing fluid which may also be electrically powered via the generator. There may also be a "hotel load" on the generator, e.g. power demanded by systems required by crew on the vessel, such as lighting, heating, galley appliances, and the like.

While at berth, a container vessel may be provided with shoreside electrical power, e.g. while its engines are shut down. The vessel may thus plug into a power grid while docked at a container terminal, for example. This can save consumption of fuel that would otherwise be used to power the engines while at the port. Certain ports may have anti-idling laws that require ships to use shore power, for example, in order to limit emissions.

Emission control areas (ECAs) may also place strict controls on the permitted amounts of certain emissions in specified sea areas. The controlled emissions can include sulphur oxides (SOX), nitrogen oxides ($NO_x$), volatile organic compounds (VOCs) and ozone-depleting substances (ODSs). Example ECAs around the world include the Baltic Sea, the North Sea, the North American ECA, and the US Caribbean ECA. There is therefore a desire to improve power management systems for container vessels so that power demands onboard can be met, while also complying with emissions controls, e.g. in ECAs.

Further, since electric power demands of a container vessel (which need to be met by onboard power sources when the vessel is away from shore power) can vary significantly, e.g. given the various powered components onboard and their respective power requirements, it may be difficult to manage the demands placed on a given generator. There is therefore a desire to also improve power management for container vessels that use onboard power sources to power vessel components.

SUMMARY

A first aspect of the present invention provides a power controller for controlling power to be supplied to at least one reefer container on a container vessel, the power controller configured to:

obtain a set temperature for at least one reefer container to be transported by the container vessel;

obtain data that indicates an amount of energy available to the container vessel; and determine, based on the amount of energy available to the container vessel, whether to cool the at least one reefer container below the set temperature.

This can allow less energy to be supplied to the at least one reefer container for a period, without affecting goods contained in the at least one reefer container. This in turn may reduce the load on the power supply systems of the container vessel meaning less fuel may be consumed by the vessel during the period. Further, the present invention allows for surplus energy available to the vessel, e.g. generated by an onboard power source, to be converted into thermal energy stored in the sub-cooled reefers. This can help avoid the surplus energy generated onboard the vessel from otherwise being wasted, e.g. while the vessel is sailing between ports.

Optionally, the amount of energy available to the container vessel comprises energy available from:

one or more power sources onboard the container vessel; and/or one or more power sources remote from the container vessel, such as shore power.

Optionally, the one or more power sources onboard the container vessel comprise one or more of:

a heat recovery system located to receive exhaust gases emitted from one or more engines of the container vessel;

a shaft generator coupled to a propeller shaft of the container vessel; and an energy recovery turbine generator located to receive wastewater from an exhaust gas treatment unit onboard the container vessel.

Optionally, the power controller is configured to obtain:

load data representative of a load on at least one generator of the container vessel; and target load data representative of a target load range for the at least one generator;

wherein the amount of energy available to the container vessel comprises surplus energy corresponding to a difference between the load on the at least one generator and a lower bound of the target load range for the generator, wherein the power controller is configured to cool the at least one reefer below the set temperature by an amount determined so as to cause the load to increase to a load within the target load range.

Optionally, the power controller is configured to determine whether to cool the at least one reefer container based on the amount of energy available to the container vessel and at least one other criterion.

Optionally, the at least one other criterion comprises at least one of:

a location on the container vessel of the at least one reefer container;

a model type of the at least one reefer container;

an amount of energy being supplied to the at least one reefer container;

a type of product contained within the at least one reefer container;

a current internal temperature of the at least one reefer container;

a coefficient of performance of the at least one reefer container; and an external air temperature at the location on the container vessel of the at least one reefer container.

Optionally, the at least one reefer container comprises plural reefer containers, and wherein the power controller is configured to determine whether to cool at least one of the reefer containers, below a respective set temperature, based on at least one of:

relative internal temperatures of the reefer containers;

relative external air temperatures, at respective locations on the container vessel, of the reefer containers;

relative locations on the container vessel of the reefer containers;

relative coefficients of performance of the reefer containers; and relative amounts of energy being supplied to the reefer containers.

Optionally, the power controller being configured to determine whether to cool the at least one reefer container below the set temperature comprises the power controller being configured to determine whether to reduce the set temperature for the at least one reefer container.

Optionally, the power controller is configured to determine whether to reduce the set temperature from a first set temperature to a second set temperature, wherein the second set temperature is determined based on the amount of energy available to the container vessel.

Optionally, the set temperature comprises a set temperature range.

Optionally, the power controller is configured to determine, based on the amount of energy available to the container vessel, whether to reduce a lower bound of the set temperature range.

Optionally, the power controller is configured to determine whether to reduce the set temperature from a first set temperature to a second set temperature, wherein the second set temperature is determined based on the amount of energy available to the container vessel.

Optionally, the power controller is located on the container vessel or remote from the container vessel.

A second aspect of the present invention provides a power control system for a container vessel, the power control system comprising:

the power controller according to the first aspect; and at least one power interface for supplying energy to the at least one reefer container.

A third aspect of the present invention provides a container vessel comprising the power control system of the second aspect.

A fourth aspect of the present invention provides a method for controlling power to be supplied to at least one reefer container on a container vessel, the method comprising:

obtaining a set temperature for at least one reefer container to be transported by the container vessel;

obtaining data that indicates an amount of energy available to the container vessel; and determining, based on the amount of energy available to the container vessel, whether to cool the at least one reefer container below the set temperature.

Optionally, the method comprises:

obtaining load data representative of a load on at least one generator of the container vessel;

obtaining target load data representative of a target load range for the at least one generator, wherein the amount of energy available to the container vessel comprises surplus energy corresponding to a difference between the load on the at least one generator and a lower bound of the target load range for the generator; and cooling the at least one reefer container below the set temperature by an amount determined so as to cause the load to increase to a load within the target load range.

Optionally, the method comprises determining whether to cool the at least one reefer container based on the amount of energy available to the container vessel and at least one other criterion.

Optionally, the at least one other criterion comprises at least one of: a location on the container vessel of the at least one reefer container;

a model type of the at least one reefer container;

an amount of energy being supplied to the at least one reefer container;

a type of product contained within the at least one reefer container;

a current internal temperature of the at least one reefer container;

a coefficient of performance of the at least one reefer container; and an external air temperature at the location on the container vessel of the at least one reefer container.

Optionally, the at least one reefer container comprises plural reefer containers, and wherein the method comprises determining whether to cool at least one of the reefer containers, below a respective set temperature, based on at least one of:

relative internal temperatures of the reefer containers;

relative external air temperatures, at respective locations on the container vessel, of the reefer containers;

relative locations on the container vessel of the reefer containers;

relative coefficients of performance of the reefer containers; and relative amounts of energy being supplied to the reefer containers.

Optionally, the determining whether to cool the at least one reefer container comprises determining whether to reduce the set temperature for the at least one reefer container.

Optionally, the set temperature comprises a set temperature range.

Optionally, the method comprises determining, based on the amount of energy available to the container vessel, whether to reduce a lower bound of the set temperature range.

Optionally, the method comprises determining whether to reduce the set temperature from a first set temperature to a second set temperature, wherein the second set temperature is determined based on the amount of energy available to the container vessel.

Optionally, the obtaining data that indicates the amount of energy available to the container vessel comprises at least one of:

obtaining data that indicates a current amount of energy available to the container vessel; and estimating an amount of energy that will be available to the container vessel at a future time.

A fifth aspect of the present invention provides a non-transitory machine-readable storage medium storing instructions that, when executed by a controller, cause the controller to carry out the method according to the fourth aspect.

BRIEF DESCRIPTION OF THE DRAWINGS

Embodiments of the invention will now be described, by way of example only, with reference to the accompanying drawings, in which.

DETAILED DESCRIPTION

Figure 1:
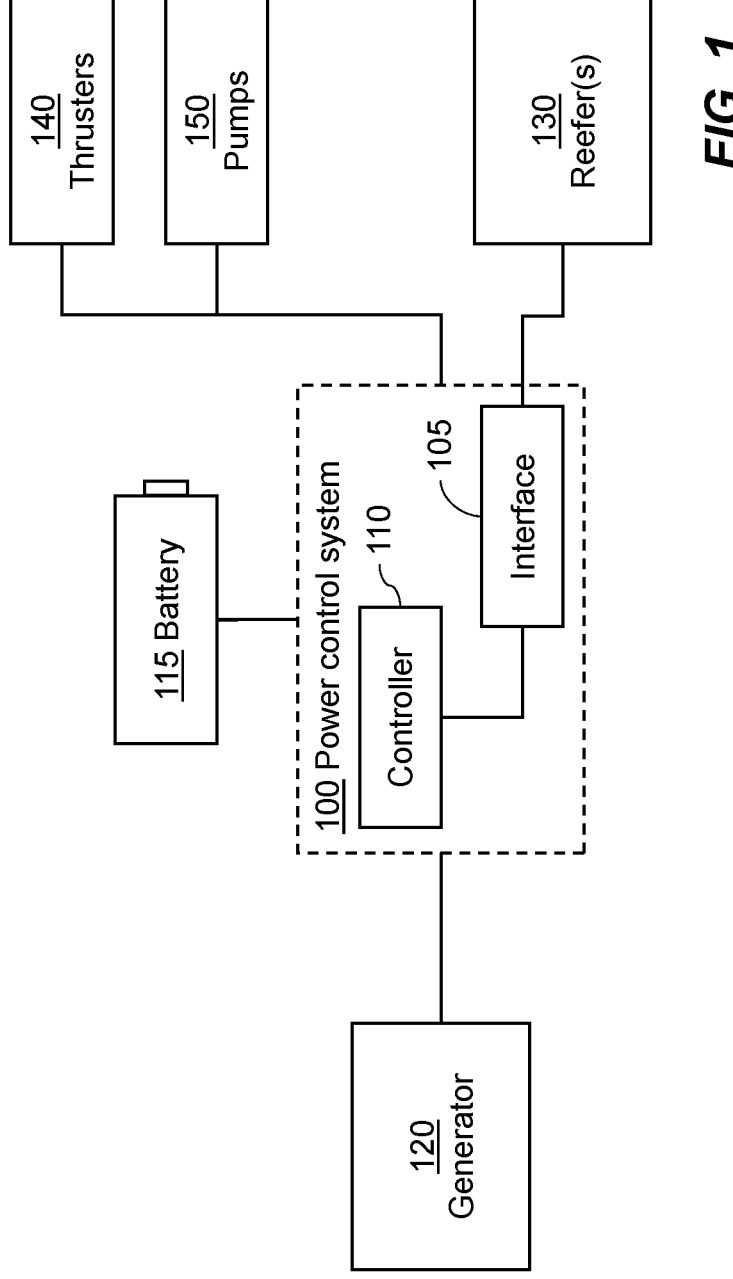
FIGS. 1 and 2 show schematic views of a power control system for a marine vessel according to examples.

Certain examples described herein provide methods and systems to control power supplied to at least one reefer container on a container vessel. A container vessel may have a plurality of containers loaded onboard, of which some may be reefer containers.

Reefer containers, also known as refrigerated containers or simply "reefers", may be used to transport temperature-sensitive goods such as food (e.g. poultry, fish, meat, etc.), plants, medicines, batteries, etc. A reefer container may comprise an integral refrigeration unit for refrigerating the container, and be powered from an external power source, such as an electrical power point (e.g. "reefer point") on the container vessel.

It has been realised that a reefer container which is to be transported by a container vessel can be utilised as a thermal energy store. For example, the reefer container can be cooled below its set temperature (e.g. which may be a programmed temperature based on the cargo to be carried by the reefer container); which may be referred to as "sub-cooling" the reefer container. By sub-cooling the reefer, so that the goods within are maintained at a temperature below the normal set temperature for the goods/reefer, it can take longer for the reefer to warm up to the ambient temperature. This means that less energy can be supplied to the sub-cooled reefer for a period of time without affecting the contained goods. This in turn reduces the reefer load on the power supply systems of the container vessel and so less fuel may be consumed by the vessel during this period of sub-cooling. Thus, when the vessel enters a low-emission zone (LEZ) or emission control area (ECA), for example, the fuel consumption of the vessel may be reduced, in turn reducing emissions/pollution levels while in the LEZ or ECA.

Also, sub-cooling reefers may allow for excess energy from the vessel, e.g. generated by an onboard gen-set, shaft generator, turbo-generators, or waste heat recovery generator, to be converted into thermal energy stored in the sub-cooled reefers. This can help avoid excess energy generated onboard the vessel from otherwise being wasted, e.g. while the vessel is sailing between ports. When traveling into port from sea, the sub-cooling of the reefer can be achieved with the onboard power supply means, e.g. an onboard gen-set. However, before departing from port to sea, sub-cooling of the reefer can additionally or alternatively be achieved using onshore electricity supplied at the (container) terminal, e.g. electricity supplied at the terminal and not onboard the vessel. Further, while the vessel is at port, a sub-cooled reefer can provide more capacity on the shoreside power grid at the port. Reefers being loaded onto the container vessel at the port may therefore be cooled to their respective set temperature ranges by the shoreside power grid before the sub-cooled reefer onboard the vessel requires power supply to keep its cargo below a maximum temperature limit for the cargo.

Further, by utilising reefers to store excess energy generated by a generator onboard the container vessel, the load on the generator can be smoothed and controlled so that the load falls within a target load range. As described, storing the excess energy at the reefers may involve reducing a temperature of the internal refrigeration space of a given reefer below a set temperature for the given reefer (i.e. "sub-cooling" the reefer as mentioned) which enables the generator load to be controlled while allowing the reefers to be temperature controlled so that products stored within the reefers are not spoiled. For example, in a temperature-controlled supply chain (also knowns as a "cold chain" or "cool chain"), products (sometimes known as "refrigerated cargo") are kept at a low-temperature range. Thus, in certain cases, the operating temperature of the reefer containing the refrigerated cargo can be reduced, as described above, while still maintaining the required temperature control for the refrigerated cargo, which allows for smoothing of the generator load within the target load range while not negatively affecting the cargo. By smoothing up- and down-surges in the generator load, fuel usage of the generator can be reduced, in a similar way to cruise control for a motor vehicle. By specifically controlling the load on the generator such that the load falls within a target load range (e.g. which includes a target load for the generator), as provided for by certain examples described herein, an operating efficiency of the generator can be improved. This may further help to reduce fuel consumption of the generator, and the container vessel, in turn reducing pollution levels as described above.

Figure 7:
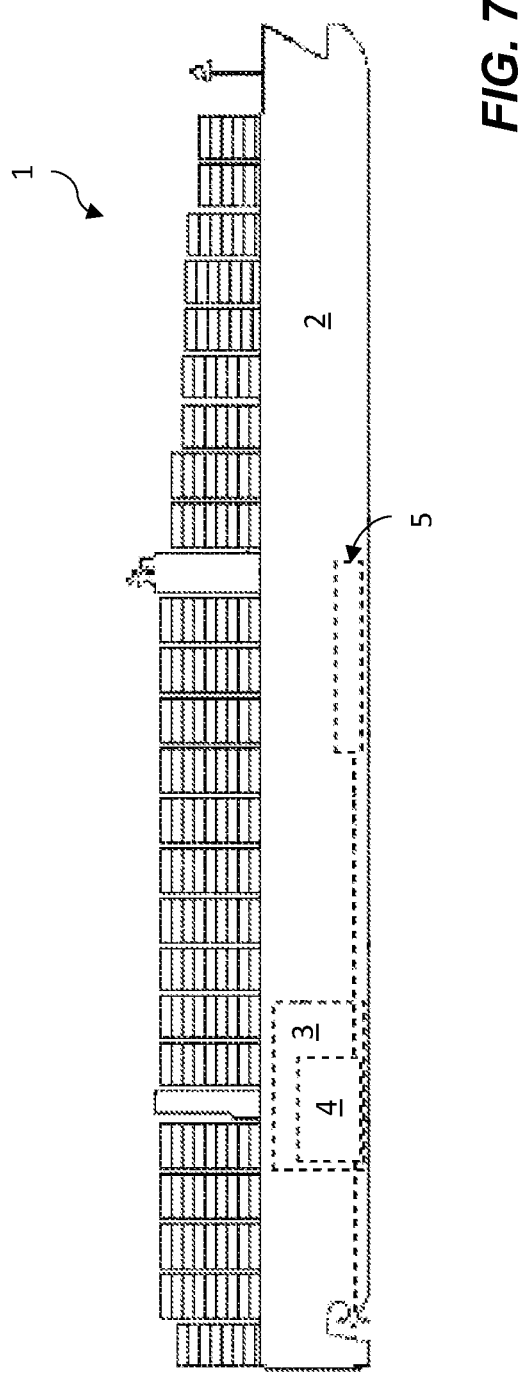
FIG. 7 shows a schematic view of a marine vessel according to examples.

FIG. 1 shows an example of a power controller 110 for controlling power to be supplied to at least one reefer container 130 on a container vessel (such as that shown in FIG. 7). The container vessel 1 of FIG. 7 has a hull 2 and one or more engine rooms 3 inside the hull 2. The container vessel 1 is powered by one or more large internal combustion engines 4, such as four-stroke or two-stroke self-igniting combustion engines 4, located in the engine room 3. The engine(s) 4 drive(s) a propulsion mechanism (such as one or more propellers). The vessel 1 also comprises a fuel system 5 for supplying fuel to the engine(s) 4.

In the example of FIG. 1 the power controller 110 is part of a power control system 100 which comprises a power interface 105 for supplying energy to at least one reefer container 130 transportable by the container vessel 1. For example, the power interface 105 may comprise an electrical power point for supplying power to the at least one reefer container 130. The power controller 110 (sometimes referred to simply as the "controller" 110) may be implemented as part of the power control system 100 located on the container vessel 1. In other cases, the controller 110 may be located remotely from the container vessel 1 and configured to communicate with the container vessel 1, e.g. to receive and send data from and to the container vessel 1, respectively. For example, in cases where the controller 110 is located remotely from the container vessel 1, the controller 110 may communicate with components on the container vessel 1, e.g. an onboard sub-controller and/or other components of the power control system 100, via respective communication interfaces at the container vessel 1 and at the remote location of the controller 110. The remote location may, for example, be on the shore, such as at a container terminal or at a logistics company headquarters, or on another vessel.

The controller 110 may be configured to obtain data. To obtain data may be to receive or retrieve the data, e.g. via a wired or wireless communications channel, from a source. In other cases, to obtain data may be to determine the data, e.g. to compute the data at the controller 110. In some cases, to obtain given data may be to both receive or retrieve initial data from a source, e.g. from another component internal or external to the power control system 100, and to then determine the given data based on the received/retrieved initial data. As an example, the controller 110 may receive input data, e.g. information relating to an onboard generator 120 such as one or more characteristics thereof, and then determine capacity data (e.g. indicative of a maximum load capacity of the generator 120) based on the input data. The determination may involve computation and/or a lookup in a database, for example. The controller 110 may also be configured to obtain cargo data, e.g. comprising information about the cargo to be transported by the container vessel 1, and/or reefer data, e.g. comprising information about a current status of one or more reefer containers, in examples. The cargo data may be obtainable from a cargo database, for example. The reefer data may be obtainable from respective reefer controllers of the one or more reefer containers, for example.

The power controller 110 is configured to obtain a set temperature for at least one reefer container 130 to be transported by the container vessel 1. For example, the set temperature for a given reefer container 130 may be set by the bill of laden for the respective cargo carried by the given reefer container 130. As an example, products such as meat, fish, etc. may have a set refrigeration temperature of minus 18 degrees Celsius (−18° C.) thereby specifying that a reefer container 130 selected to transport such products is to be refrigerated to −18° C. as the set temperature. In examples, the set temperature comprises a set temperature range. For example, the set temperature range may be set by a predetermined tolerance combined with a set temperature value. An operational tolerance of +/−2° C. applied to the set temperature value of −18° C., for example, gives a set temperature range of −20° C. to −16° C.

The power controller 110 is configured to obtain data that indicates an amount of energy available to the container vessel 1. In some cases, the power controller 110 may be configured to determine the amount of energy available to the container vessel 1. The amount of energy available to the container vessel 1 may include energy available from one or more power sources onboard the container vessel 1, for example. Such onboard power sources may include a heat recovery system, a shaft generator, and/or an energy recovery turbine generator. The (waste) heat recovery system may comprise an exhaust gas boiler, a power turbine, and/or a steam turbine with an alternator. The system may be located to receive exhaust gases emitted from one or more engines of the container vessel 1, to recover thermal energy from the exhaust gases and convert it into electrical energy. The shaft generator may be coupled to a propeller shaft of the container vessel 1, for example. The energy recovery turbine generator may be located to receive wastewater from an exhaust gas treatment unit, also known as a scrubber, onboard the container vessel 1. For example, the energy recovery turbine generator—also known as a Hydraulic Power Recovery Turbine (HPRT)—may operate like a pump in reverse; whereby energy from a wastewater flow can be exploited to drive a rotatable shaft and produce a useable mechanical output, recovering some of the energy in the process.

Additionally, or alternatively, the amount of energy available to the container vessel 1 may comprise one or more power sources remote from the container vessel, such as shore power. Shore power, or "shore supply", may comprise shoreside electrical power provided to the container vessel at berth, e.g. at a container terminal, while its main and auxiliary engines are optionally shut down. While berthed at the terminal the container vessel 1 may thus plug into the land-based power, which may be grid power or sometimes an external remote generator. Such remote generators may be powered by diesel or renewable energy sources, e.g. wind or solar. Shore power saves consumption of fuel that would otherwise be used to power the container vessel while at the terminal, thus reducing the air pollution associated with consumption of that fuel. For example, a port city may have anti-idling laws that require vessels to use shore power. Use of shore power may facilitate maintenance of the engines and generators onboard the container vessel 1.

Based on the amount of energy available to the container vessel 1, the power controller 110 is configured to determine whether to cool the at least one reefer container 130, to be transported by the container vessel 1, below the set temperature for the at least one reefer container 130. For example, the power controller 110 may determine that there is more energy available to the container vessel 1 than is demanded, e.g. to operate the components onboard at the demanded power levels, and so may determine to cool the at least one reefer container 130 below the set temperature by using the surplus energy available to the container vessel 1. As an example, when a heat recovery system or energy recovery turbine generator is utilised, and the recovered energy contributes to the amount of energy available to the container vessel 1 exceeding the energy demands of the container vessel 1, the power controller 110 may determine to sub-cool the at least one reefer container 130 using surplus energy recovered at the heat recovery system or energy recovery turbine generator. The surplus energy may effectively be converted to thermal energy stored at the at least one reefer container 130, as described herein, which may allow the container vessel 1 to operate without powering the reefers for a period. This can reduce the reefer load on the vessel during this period, in turning meaning less fuel is consumed by the vessel during the period.

In certain cases, the power controller 110 may determine to not cool the at least one reefer container 130 below the set temperature, e.g. if the power controller 110 determines that there is not sufficient (or any) surplus energy available to the container vessel 1 than is demanded by the container vessel 1.

A generator 120 onboard the container vessel 1 may comprise an electrical generator combined with an engine (e.g. a prime mover). For example, the generator 120 may comprise a diesel generator—a combination of a diesel engine with an electric generator (e.g. an alternator)—to generate electrical energy. The generator 120 may be used to provide electrical power to components of the container vessel 1, for example thrusters 140 which may be operated by electric motors controlled from a bridge on the container vessel 1. The thrusters 140 may include propellers, laterally mounted on the container vessel 1, that can suck or blow water from port to starboard (i.e. left to right) or vice versa. The thrusters 140 may thus be used in maneuvering the container vessel 1, e.g. during docking operations. Pumps 150 on the container vessel 1, e.g. container pumps, may also be electrically powered via the generator 120. For example, the pumps 150 may be driven by one or more electric motors to transport or displace fluid, the electric motor(s) being supplied electrical energy generated by the generator 120. The generator 120 may also be used to provide electrical power to systems required by crew on the vessel, such as lighting, heating, galley appliances, and the like, which can comprise a "hotel load" on the generator 120.

In examples, the power controller 110, e.g. as part of the power control system 100 for the container vessel 1, is configured to obtain load data representative of a load on the generator 120. The load on the generator 120 may be the total power output of the generator 120, e.g. at a given time or over a given time period. The load data may thus be representative of a power value, or a timeseries of power values, e.g. in units of watts (W) or kilowatts (kW). For example, the generator 120 may have a maximum load capacity, represented by a given power value (or "wattage"), which is the maximum amount of electrical power that can be supplied by the generator 120. At any given time, the generator 120 may thus be operating at a load between zero (OW) and its maximum load capacity.

The power controller 110 may also be configured to obtain target load range data representative of a target load range for the generator. In some examples, the power controller 110 is part of a Power Management System (PMS) which may comprise an Energy Management System (EMS). For example, the power control system 100 for the container vessel 1 may form or be part of the PMS and/or EMS. In some examples, one purpose of the PMS and/or EMS is to ensure there is always power available for the safe operation of the container vessel 1. The PMS may start and stop one or more generators 120 and/or disconnect less important loads to ensure power for important loads in a critical situation, for example. To reach a more effective way of operating the vessel, the EMS can optimise the load condition of the one or more running generators 120 in combination with energy storage devices like batteries. In examples, the target load range may encompass a target load for the generator 120. The target load may be a predetermined power value that the generator 120 is intended to operate at. For example, the target load may be an absolute power value, e.g. a specific wattage, such as 500 kW. Alternatively, the target load may be expressed relative to the maximum load capacity of the generator 120, e.g. as a fraction or percentage of the maximum load capacity. In an example, the target load may be a load percentage of 85% of the maximum load capacity of the generator 120. Other load percentages, such as falling within a range 70% to 90%, may apply in some other examples. In certain cases, the target load range may be based on an efficiency of the generator 120, or specifically of the engine of the generator 120. For example, the target load range may be determined, or predetermined, to be a load range on the generator 120 that provides a peak efficiency of the generator 120 (or specifically the engine component thereof). It may be determined that the generator 120 may operate most efficiently at a load percentage (such as 85%) or load percentage range (such as 80% to 90%) of the maximum load capacity of the generator 120, for example. The specific load percentage (range) may be determined as a most effective load condition on the generator 120 (or engine component thereof), for example, to provide a load condition that is optimised, e.g. by the EMS as described above.

The efficiency of the generator 120 may correspond to a ratio between power available at the generator output and energy supplied at the generator input. The power available at the output of the generator 120 may be a net electrical power, e.g. after all losses such as core, copper and mechanical losses. The input to the generator 120 may be a mechanical input, e.g. acquired by turbine blades, driven by an energy source, e.g. fuel such as marine grade diesel or heavy fuel oil. The efficiency of the generator 120 may thus be based on an efficiency of an engine of the generator 120. The efficiency of the engine may correspond to a specific fuel oil consumption of the engine, i.e. a mass of fuel consumed by the engine per unit energy, which may be represented in units of kilogram per kilowatt-hour (kg/kWh) or grams per brake horse power per hour (g/bhp·h) for example. Thus, a maximum or peak efficiency of an engine may correspond to a minimum specific fuel oil consumption for the engine. In certain cases, the target load of the generator 120 may correspond with the minimum specific fuel oil consumption of the engine part of the generator 120.

Figures 3A, 3B:
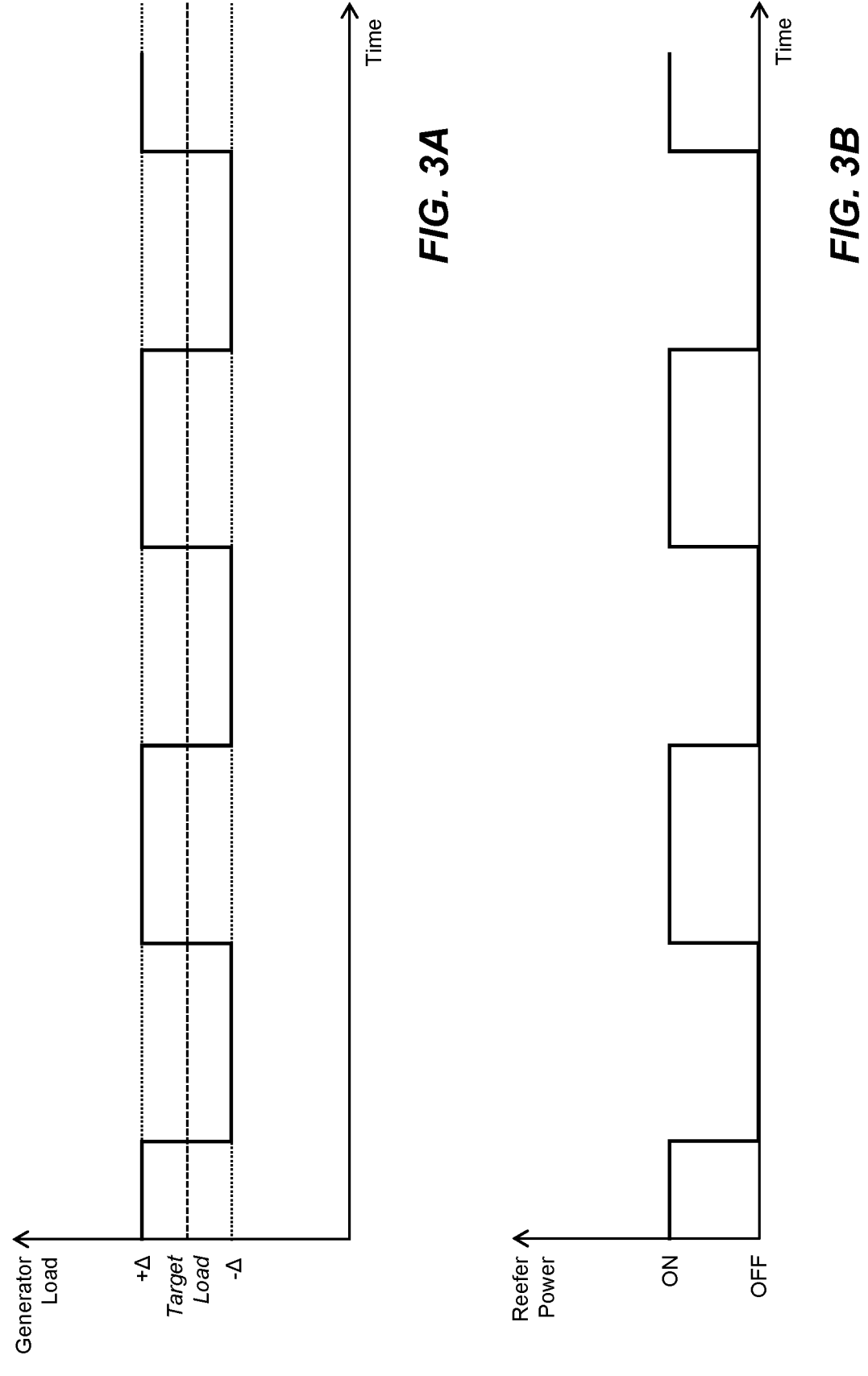
FIGS. 3A and 3B show charts illustrating an example of managing a load on a generator.

The controller 110 may be configured to control the load on the generator 120 such that the load falls within the predetermined (or "target") load range, e.g. which includes the target load, by cooling the at least one reefer below the set temperature. The target load range may correspond to a predetermined range of load values, or percentage load values, either side of the target load value. FIG. 3A shows an example where the target load comprises a predetermined load value, e.g. 85% of the maximum load capacity of the generator load. The power control system is configured to control, e.g. maintain, the generator load such that it falls within a predetermined range of the target load value ±Δ, where Δ is a predetermined load value defining the ends of the range. For example, Δ may be an absolute power value such as 10 kW. Alternatively, Δ may be a load percentage (e.g. 5%) of the maximum load capacity of the generator 120. In another example, Δ may be a percentage (e.g. 10%)

of the target load value (e.g. if the target load were 450 kW the target load range would be 450 kW±45 kW, i.e. from 405 kW to 495 kW which includes the target load value of 450 kW). In some examples, the target load range may be asymmetric about the target load value. For instance, given a target load value of L, the power control system may be configured to control the generator load such that it falls within a predetermined range: $\Delta_1 \leq L \leq \Delta_2$; where $\Delta_1$ and $\Delta_2$ are different values. In some cases, the target load range for the generator may be based on a predicted load for the generator, e.g. at a future time.

As described, the power controller 110 is configured to obtain data that indicates an amount of energy available to the container vessel 1, which may include surplus energy corresponding to a difference between the load on the generator 120 and a lower bound of the target load range for the generator; e.g. where the load on the generator 120 is below $\Delta_1$ in the example above. In certain cases, the power controller 110 is configured to cool the at least one reefer 130 below the set temperature for the at least one reefer 130 by an amount determined to cause the load to increase to a load within the target load range.

In examples, the power controller 110 may thus control the load on the generator 120 such that it falls within the target load range by the controller 110 routing excess energy, generated by the generator 120 when the load is below the target load range, to the power interface 105 for storage at the at least one reefer container 130. For example, given the target load range of 405 kW to 495 kW, which includes the target load value of 450 kW, when the load on the generator 120 is below 405 kW the controller 110 routes at least some of the surplus energy, e.g. the difference in energy between the actual load on the generator 120 and the lower bound of the target load range, to the power interface 105 for storage at the at least one reefer container 130.

As described, the at least one reefer container 130 may thus effectively be utilised as a (thermal) energy store. For example, when the generator 120 is operating at a load below the target load range, the at least one reefer container 130 may be actively cooled below a set temperature for the at least one reefer container 130 by the controller 110 routing surplus energy to power the respective refrigeration unit of the at least one reefer container 130. Such sub-cooling of the at least one reefer container 130 involves the generator 120 doing extra work relative to a current load, e.g. at which the generator maintains the temperature of at least one reefer container 130 at the set temperature. In this way, the total load on the generator, i.e. including the reefer load attributed to providing energy to the at least one reefer container 130, is brought within the target load range. In some cases, the controller 110 may determine a difference between the load on the generator 120 and the lower bound of the target load range for the generator 120 and route an amount of surplus energy, corresponding to the determined difference, to the power interface 105 for storage at the at least one reefer container 130.

When the load on the generator 120 is above the target load range, e.g. above the upper bound of the range, the power control system 100 may be configured to control the load such that it falls within the target load range by the controller 110 controlling energy stored at the at least one reefer container 130 via the power interface 105. For example, the at least one reefer container 130 may comprise thermal energy that was stored when the load on the generator 120 was previously below the target load range which caused the controller 110 to route the excess energy for storage at the at least one reefer container 130, e.g. by subcooling the at least one reefer container 130 as described. Thus, when the load on the generator 120 subsequently rises above the target load range, at least some of the stored thermal energy stored at the at least one reefer container 130 can be utilised, e.g. by reducing the energy suppled to at least one reefer container 130, so that the total load on the generator, i.e. including the reefer load, is brought within the target load range.

In some cases, the controller 110 controls the energy stored at the at least one reefer container 130 by reducing energy supplied to the at least one reefer container 130 via the power interface 105. Reducing the energy supplied to a given reefer container may involve stopping the supply of energy to the given reefer container, e.g. by terminating power supply to the given reefer container via the associated power interface 105. This may be done based on the cargo (e.g. commodity, produce) stored within the at least one reefer container where possible, for example based on cargo data obtained by the controller 110 as mentioned above.

The power interface 105 may comprise a device or outlet, e.g. an electrical power point, to which the at least one reefer container 130 is connected for powering the at least one reefer container 130. In examples, the power control system 100 includes a plurality of power interfaces (e.g. power interfaces 105a-105d in FIG. 2), like the power interface 105 described above, for supplying a plurality of reefer containers 130 (e.g. reefers 130a-130e in FIG. 2; described further below). For example, each power interface 105 may supply power to a respective reefer container 130 in a one-to-one relationship. Additionally, or alternatively, one or more power interfaces 105 of the plurality of power interfaces may each supply power to plural reefer containers 130 in a one-to-plural relationship.

As described herein, the load on the generator 120 can include a reefer load which comprises the energy supplied to the plurality of reefers 130 transportable by, e.g. located on, the container vessel 1. For example, the generator 120 may generate power for supplying to the reefers 130, with the share of the total power generated by the generator 120 (i.e. the total load on the generator 120) attributable to this corresponding to the reefer load. The power control system 100 may therefore be configured to control the generator load such that it falls within the target load range by the controller 110 controlling energy stored at the plurality of reefers 130, via the plurality of power interfaces 105, to reduce the reefer load such that the generator load falls within the target load range.

For example, referring to FIG. 1 and considering the case where there is a plurality of reefers transportable by the container vessel 1, the load on the generator 120 may be made up of: the reefer load for supplying the plurality of reefers 130; a thruster load for supplying power to the thrusters 140; a pump load for supplying power to the pumps 150; and a hotel load. Thus, the controller 110 may control thermal energy stored at the plurality of reefers 130, via the one or more power interfaces 105, in order to reduce the reefer load while maintaining the thruster and pump loads. For example, the reefer load may be reduced, by reducing energy supplied to the reefers, until the load falls within the target load range. In this way, thermal energy that is stored in the reefers (e.g. by previous sub-cooling of the reefers) can be released by turning up the respective temperature setting of selected reefers, while still being below a pre-set maximum temperature (e.g. a "booking setting" set by the bill of laden for the respective cargo carried by the reefer containers). Therefore, the selected reefers will not call for cooling until the reefer temperature approaches the adjusted set temperature, e.g. the respective refrigeration unit of the selected reefers may stop and only use power for internal fan rotation.

As described herein, the power controller 110 is configured to determine, based on obtained data indicating an amount of energy available to the container vessel 1, whether to cool the at least one reefer container 130, transportable by the container vessel 1, below the set temperature for the at least one reefer container 130. In some examples, the obtained data is received via wired or wireless signals between the power controller 110 and the at least one reefer container 130.

In examples, the power controller 110 being configured to determine whether to cool the at least one reefer container 130 below the set temperature involves the power controller 110 being configured to determine whether to reduce the set temperature for the at least one reefer container 130. For example, the power controller may be configured to determine whether to reduce the set temperature from a first set temperature to a second set temperature. In some examples, the power controller 110 may be configured to determine, via input signals from the power interface 105 and/or a reefer unit controller for the at least one reefer container 130, to start sub-cooling the at least one reefer container 130 below the first set temperature. In some examples, the input signal may be a wired or wireless signal. In some examples, the input signal may be sent as a "dead man's" system such that power controller 110 may be configured to determine an input signal to start sub-cooling the at least one reefer container 130, then the at least one reefer container 130 is returned to normal cooling operation, e.g. if the signal is no longer received. The second set temperature may be determined based on the amount of energy available to the container vessel. For example, where the power controller 110 determines that a surplus amount of energy is available to the container vessel 1, the power controller 110 may allocate at least part of the surplus to increasing the reefer load by a set amount. The set amount of increase in the reefer load, to at least partly reduce the surplus of energy available, in turn may set the second set temperature for the at least one reefer 130. In other words, the power controller 110 may determine that, to increase the reefer load by a certain number of watts, the set temperature for the at least one reefer is to be reduced by a certain number of degrees. Operating the at least one reefer at the second set temperature increases the reefer load and so at least partly reduces the surplus, storing the extra energy as thermal energy at the at least one reefer.

Considering an example where the amount of energy available to the container vessel comprises energy available from an onboard generator 120, the at least one reefer 130 may operate at a first set temperature and then when there is excess energy available, the excess energy is routed by the controller 110 to operate the at least one reefer at a second set temperature where the second set temperature is lower than the first set temperature. The controller 110 may thus route energy from the generator 120, e.g. via the power interface 105, to cool the at least one reefer below a set temperature for the at least one reefer container. This may be done when the load on the generator 120 is below the target load range, for example, for the power control system 100 to control the load on the generator 120 to fall within the target load range.

In an example, the reefer may have a first set temperature of −18° C. and the controller 110 may cause the sub-cooling of the reefer to a second set temperature of −25° C., i.e. lower than the first set temperature. In some examples, the controller 110 may cause the sub-cooling of the reefer by a predetermined amount, e.g. a predetermined number of degrees Celsius. Sub-cooling the reefer effectively makes the reefer a thermal energy store since energy is not required to refrigerate the reefer for as long as the reefer is sub-cooled below its original temperature setting. Thus, the sub-cooled reefer may not have to be actively cooled by its refrigeration unit for a longer amount of time, compared to a reefer that has not been sub-cooled, since the sub-cooled reefer takes longer to warm up. In this way, the at least one reefer can be considered as part of the energy storage onboard the vessel. Sub-cooling the reefer may also not affect the contents of the reefer e.g. spoil the cargo contained therein. For example, operating the reefer at such lower temperatures can cause microbes to be destroyed and help preserve frozen cargo contained within the reefer container.

Figure 5A:
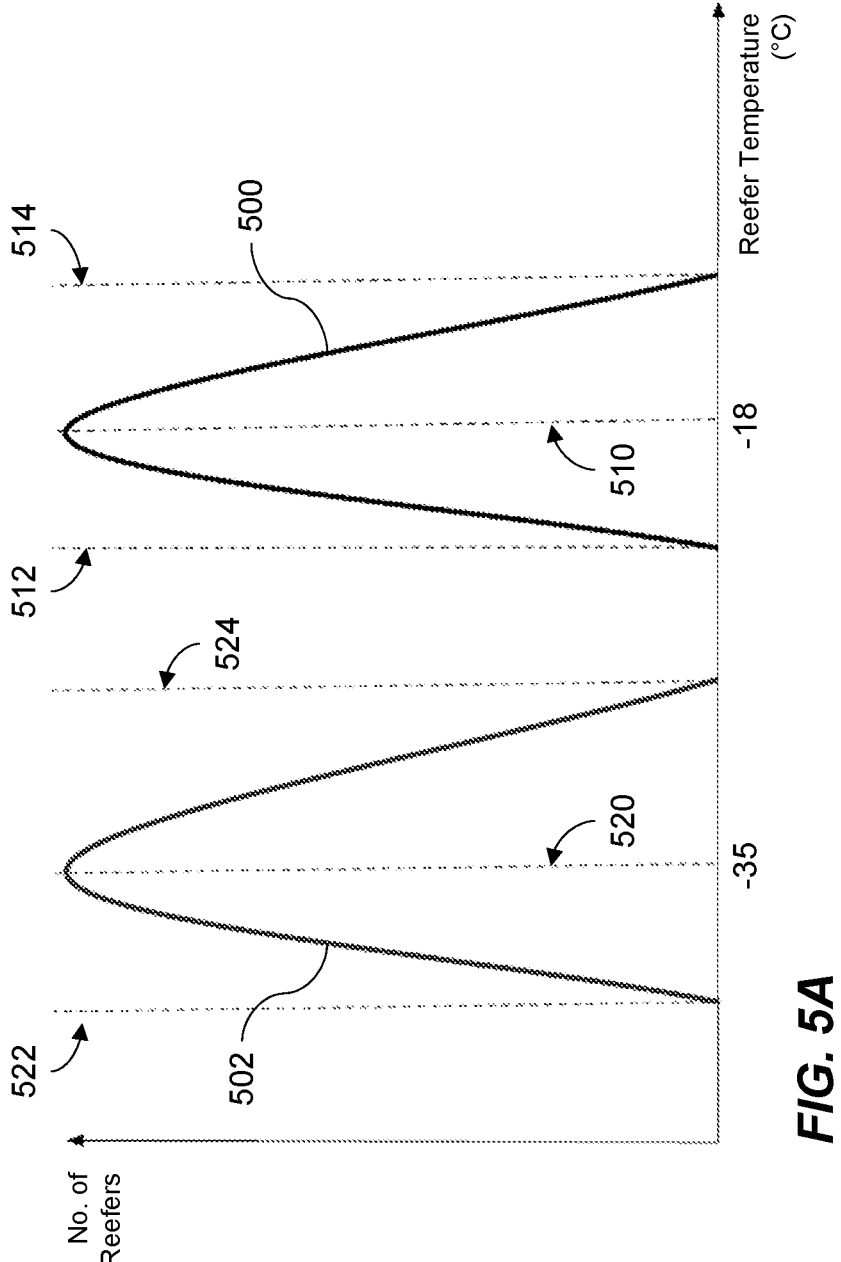
FIGS. 5A to 5C show charts illustrating temperature distributions of reefer containers according to examples.

FIG. 5A shows an example first temperature distribution 500 for a plurality of reefers on a chart with the number of reefers versus their respective temperatures. In the first temperature distribution 500 the reefers are operating according to a first set temperature 510, in this example −18° C. The reefers of the first temperature distribution 500 all lie within a temperature range between a first lower temperature 512 and a first upper temperature 514. For example, the temperature range may be a predetermined set temperature range for the reefers, in other words the set temperature for each reefer may comprise a set temperature range, e.g. between the first lower temperature 512 (such as −20° C.) and the first upper temperature 514 (such as −16° C.).

In some cases, the temperature range between the first lower temperature 512 and the first upper temperature 514 may be provided by a predetermined tolerance about the set temperature. For example, a tolerance of +/−2° C. applied to the first set temperature 510 of −18° C. in this example gives the temperature range between −20° C. and −16° C., i.e. between the first lower temperature 512 and the first upper temperature 514. In the example of FIG. 5A, the plurality of reefers is sub-cooled to a second set temperature 520 lower than the first set temperature 510, in this example −35° C. The sub-cooled reefers, shown by the second temperature distribution 502, lie within a temperature range between a second lower temperature 522 and a second upper temperature 524. For example, the first lower and upper temperature limits 512, 514 may be lowered to the second lower and upper temperature limits 522, 524 respectively. Alternatively, the set temperature for the plurality of reefers may be lowered from the first set temperature 510 (e.g. −18° C.) to the second set temperature 520 (e.g. −35° C.) with the predetermined tolerance kept the same (e.g. +/−2° C.), for example to give the set temperature range between the second lower temperature 522 (e.g. −37° C.) and the second upper temperature 524 (e.g. −33° C.) for the plurality of reefers in the second temperature distribution 502.

Figure 5B:
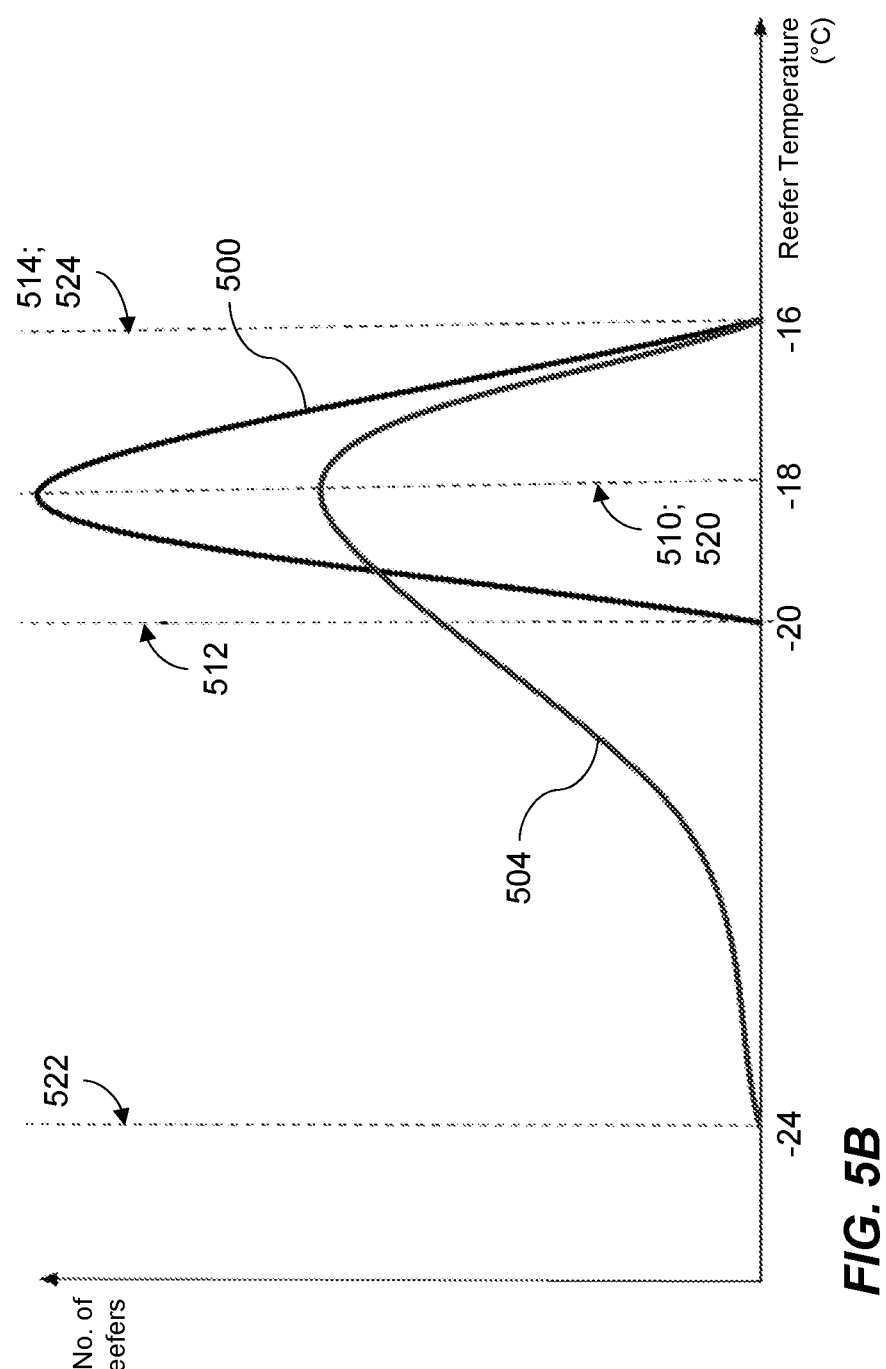

FIG. 5B shows another example in which a plurality of reefers has a first temperature distribution 500 about a first set temperature 510 and between a first lower temperature 512 and a first upper temperature 514. In FIG. 5B, the first temperature distribution 500 is the same as that of FIG. 5A, i.e. the first lower temperature 512 is −20° C., the first upper temperature 514 is −16° C., and the first set temperature 510 is −18° C. As described above, the plurality of reefers represented by the first temperature distribution 500 may have a first set temperature range between the first lower temperature 512 and the first upper temperature 514. In this example, subcooling the plurality of reefers involves reducing the lower bound of the first set temperature range, i.e. the first lower temperature 512, e.g. without adjusting the first set temperature 510 or the first upper temperature 514 for the plurality of reefers. For example, the second temperature distribution 504 in FIG. 5B shows a second set temperature range for the reefers which has a second set temperature 520 equal to the first set temperature 510 (e.g. −18° C.) and a second upper temperature 524 equal to the first upper temperature 514 (e.g. −16° C.). However, the second lower temperature 522 (e.g. −24° C.) is lower than the first lower temperature 512 (e.g. −20° C.). Thus, in the second temperature distribution 504 of reefers, there are reefers operating at temperatures below the first set temperature range where there were none in the first temperature distribution 500. These reefers are thus subcooled and can thereby store excess energy, in the form of thermal energy, available to the container vessel 1, e.g. surplus energy generated by the generator 120 for the generator 120 to operate within the target load range. In certain cases, therefore, the power controller may be configured to determine, based on the amount of energy available to the container vessel 1, whether to reduce a lower bound of the set temperature range.

In certain cases, the power controller 110 may be configured to determine whether to cool the at least one reefer container without changing the set temperature of the at least one reefer container. For example, based on the amount of energy available to the container vessel, the power controller 110 may determine to cool the at least one reefer container 130 below the set temperature for the at least one reefer container, but with no specific lower set temperature, e.g. no specific lower temperature limit. For example, in such cases the power controller 110 may cause surplus energy to be supplied to the at least one reefer container 130, thereby sub-cooling the at least one reefer container 130 and increasing the associated reefer load, without adjusting the set temperature for the at least one reefer container 130.

In some examples, the power controller is configured to determine whether to cool the at least one reefer container 130 based on the amount of energy available to the container vessel 1 and at least one other criterion. For example, such a criterion may be a location on the container vessel of the at least one reefer container, a model type of the at least one reefer container, and/or a type of product contained within the at least one reefer container.

The model type of a given reefer may comprise a manufacturer identifier and/or a specific model identifier, for example. These parameters may be accessible to the controller 110 via a database, e.g. a reefer database, which may also store the age of the reefers as another parameter. In examples, an efficiency of a given reefer may be determined based on the specifications (e.g. model type) and dynamic operational data for the given reefer. An expected performance of the given reefer can therefore be determined. In certain cases, the power controller may therefore be configured to determine whether to cool the at least one reefer container 130 based on the expected performance of the at least one reefer container 130. In some examples, the power controller 110 may be configured to determine whether to cool the at least one reefer container 130 based on a coefficient of performance of the at least one reefer container 130.

In some examples, the power controller may be configured to determine whether to cool the at least one reefer container 130 based on a current or planned location of the container vessel. For example, in cases where the container vessel is planned to navigate into an ECA, the power controller may determine to sub-cool the at least one reefer container 130 to utilise the effective thermal energy store of the at least one reefer container 130. Thus, when in the ECA, the sub-cooled reefer containers 130 can operate at a lower power input, thereby reducing the load on the onboard power sources so that less fuel is burned and the emissions are lowered.

Further additional or alternative criteria for the power controller to determine whether to cool the at least one reefer container 130 based thereon include an amount of energy being supplied to the at least one reefer container, a current internal temperature of the at least one reefer container, and an external air temperature at the location on the container vessel of the at least one reefer container.

Temperature data, indicative of the internal temperature of a given reefer container, may be measured by a temperature sensor that is part of the reefer, for example a thermocouple in the reefer container that is connected to a reefer controller of the given reefer container. Each reefer container may have its own reefer controller, refrigeration unit and temperature sensor(s) where the reefer controller is to only control the individual reefer container, e.g. the refrigeration unit thereof. The power controller 110, e.g. as part of the power control system 100 for the container vessel 1, may therefore be configured to receive reefer temperature data, e.g. indicative of the measured reefer temperature for a given reefer container, from the temperature sensor(s) or reefer controller of the given reefer container, for example.

An external air temperature at the location on the container vessel of the at least one reefer container may be measured by the temperature sensor(s) of the at least one reefer container, as described above, or by separate temperature sensors mounted as part of the container vessel. For example, a given reefer container may have one or more external temperature sensors arranged to measure the surrounding air temperature of the given reefer container, e.g. in addition to the one or more temperature sensors arranged to measure the internal reefer temperature. The power controller 110, e.g. as part of the power control system 100 for the container vessel 1, may therefore be configured to receive air temperature data, e.g. indicative of the measured air temperature surrounding a given reefer container, from the external temperature sensor(s) or reefer controller of the given reefer container, for example.

The power controller 110 may therefore be configured to determine whether to cool the at least one reefer container 130 based on a current internal temperature of the at least one reefer container and/or an external air temperature at the location on the container vessel of the at least one reefer container. For example, the power controller 110 may determine to sub-cool a reefer based on the reefer already operating at or below a predetermined internal temperature, e.g. −10° C. Additionally or alternatively, the power controller 110 may determine to sub-cool a reefer dependent on an external air temperature of the reefer being at or below a predetermined external temperature, e.g. 15° C. In certain cases, the power controller 110 may determine to sub-cool a reefer based on a temperature differential, between the current internal temperature of the reefer and the external air temperature at the location on the container vessel of the reefer, being below a predetermined temperature differential, e.g. 25° C. For example, a reefer operating at a lower temperature differential between the internal and external temperatures of the reefer may take longer to warm up than another reefer operating at a higher temperature differential. Thus, it may be preferable to store surplus energy at reefer containers that have lower temperature differentials and will take longer to warm up, since the loss of stored thermal energy to the reefer surroundings will be slower.

Figure 2:
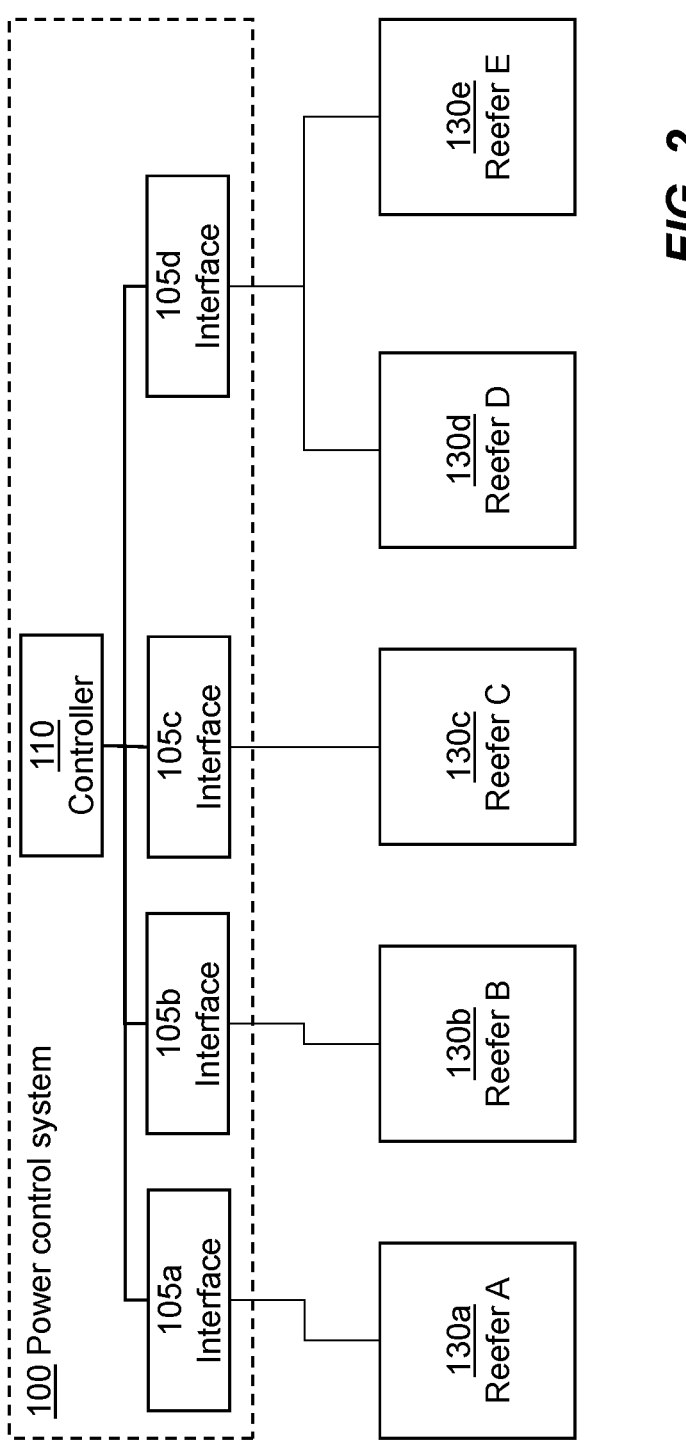

In certain examples, the at least one reefer container 130 comprises plural reefer containers. For example, there may be a plurality of reefers 130 transportable by the container vessel 1, which e.g. are supplied power by a plurality of power interfaces 105. FIG. 2 shows an example where five reefers 130a, 130b, 130c, 130d, 130e are supplied power via a plurality of power interfaces 105a, 105b, 105c, 105d as part of the power control system 100 for the container vessel 1. The controller 110 may thus be configured to determine whether to cool at least one of the reefers, e.g. by routing excess energy thereto via one or more power interfaces 105, based on certain criteria. For example, a subset of the reefers A-E shown in FIG. 2 may be selected by the controller 110 to store excess energy, e.g. generated by the generator 120.

In such cases, the controller 110 may select the one or more reefers 130 based on a time elapsed since excess energy was last routed to the one or more reefers by the controller 110. For example, the controller 110 may select those reefers 130 associated with the longest times elapsed since excess energy was last routed thereto, e.g. in other words the reefers 130 that have gone the longest without having excess energy routed to them. In examples, the controller 110 may select the one or more reefers 130 based on a time elapsed since the one or more reefers last performed a refrigeration cycle. For example, the controller 110 may select those reefers 130a, 130b, 130c, 130d, 130e associated with the longest times elapsed since a refrigeration cycle was performed thereby. In other words, the controller 110 may select the one or more reefers 130a, 130b, 130c, 130d, 130e that have gone the longest time without having performed a refrigeration cycle.

The refrigeration cycle may comprise a vapor compression cycle, vapor absorption cycle, gas cycle, or Stirling cycle depending on the type of refrigerator employed by the reefer, for example. In the case of the vapor compression cycle, a circulating working fluid (also called a "refrigerant") travels through a compressor, a condenser, an expansion valve (also called a "throttle valve") and an evaporator (where the refrigerant as a cold liquid-vapor mixture is vaporized by cooling the warmer air from the space being refrigerated) before returning to the compressor inlet to complete the cycle. Thus, a respective time period since the last refrigeration cycle was performed or completed by each reefer 130a, 130b, 130c, 130d, 130e may be tracked, and the controller 110 may select the one or more reefers based on the time periods corresponding to the one or more reefers, for example. In some examples, a number of refrigeration cycles performed by a reefer can be counted, and the controller 110 may select the one or more reefers based on the number of refrigeration cycles performed by the one or more reefers. For example, the controller 110 may prioritise the reefers that have performed the fewest chilling cycles when determine whether to cool at least one of the reefer containers 130a, 130b, 130c, 130d, 130e.

Additionally, or alternatively, the controller 110 may determine whether to cool at least one of the reefer containers based on a respective location on the container vessel 1 of the one or more reefers relative to other reefer containers of the plurality of reefer containers 130a, 130b, 130c, 130d, 130e. For example, the controller 110 may prioritise reefers that are located in certain areas on the container vessel 1. For example, the controller 110 may prioritise reefer containers that are surrounded by other reefer containers in the plurality of reefers when determine whether to cool at least one of the reefer containers, selecting one or more reefers to sub-cool. Such surrounded reefer containers may be more insulated than other reefer containers located closer to the outside of the container vessel, e.g. by the other reefer containers themselves, and so warm more slowly and thus store thermal energy for longer. In another example, the controller 110 may prioritise reefers that are closer to the generator 120, a different onboard power source, or another defined location on the container vessel 1. Data identifying positions of the reefers may be stored in memory (such as a database) as part of the reefers (e.g. accessible by the reefer controllers) or part of the container vessel 1. The controller 110 may be configured to receive an indication of the data or the positions directly or indirectly from the memory, for example.

Additionally, or alternatively, the controller 110 may select the one or more reefers based on a type of product contained within the one or more reefers, e.g. relative to other reefers in the plurality of reefer containers 130a, 130b, 130c, 130d, 130e. For example, the controller 110 may actively not select a reefer which contains a product that is not temperature stable. For example, a product that is not temperature stable may deteriorate when exposed to a temperature outside, e.g. below, a specific temperature range. Thus, subcooling, e.g. changing the set temperature of, a reefer containing such a product may risk spoiling the product. The controller 110 may therefore be configured to not select such a reefer when selecting the one or more reefers for routing excess energy to. As described, cargo data (e.g. comprising information relating to products contained by the reefer containers to be transported by the container vessel) may be obtainable by the controller 110. For example, the cargo data may be stored in memory (such as a database) that is part of the reefer or part of the container vessel 1, e.g. the memory referred to in the example above. The controller 110 may be configured to receive an indication of the data or the product directly or indirectly from the memory.

Additionally, or alternatively, the controller 110 may determine whether to cool at least one of the reefer containers, e.g. select the one or more reefers, based on a current internal temperature of the one or more reefers, e.g. relative to other reefers in the plurality of reefer containers 130a, 130b, 130c, 130d, 130e. For example, the controller 110 may select those reefers which are operating at the highest refrigeration temperatures within a temperature range of a set temperature. The controller 110 may select those reefers which are operating at a refrigeration temperature closest to an upper limit of their respective set temperature range, for example.

Figure 5C:
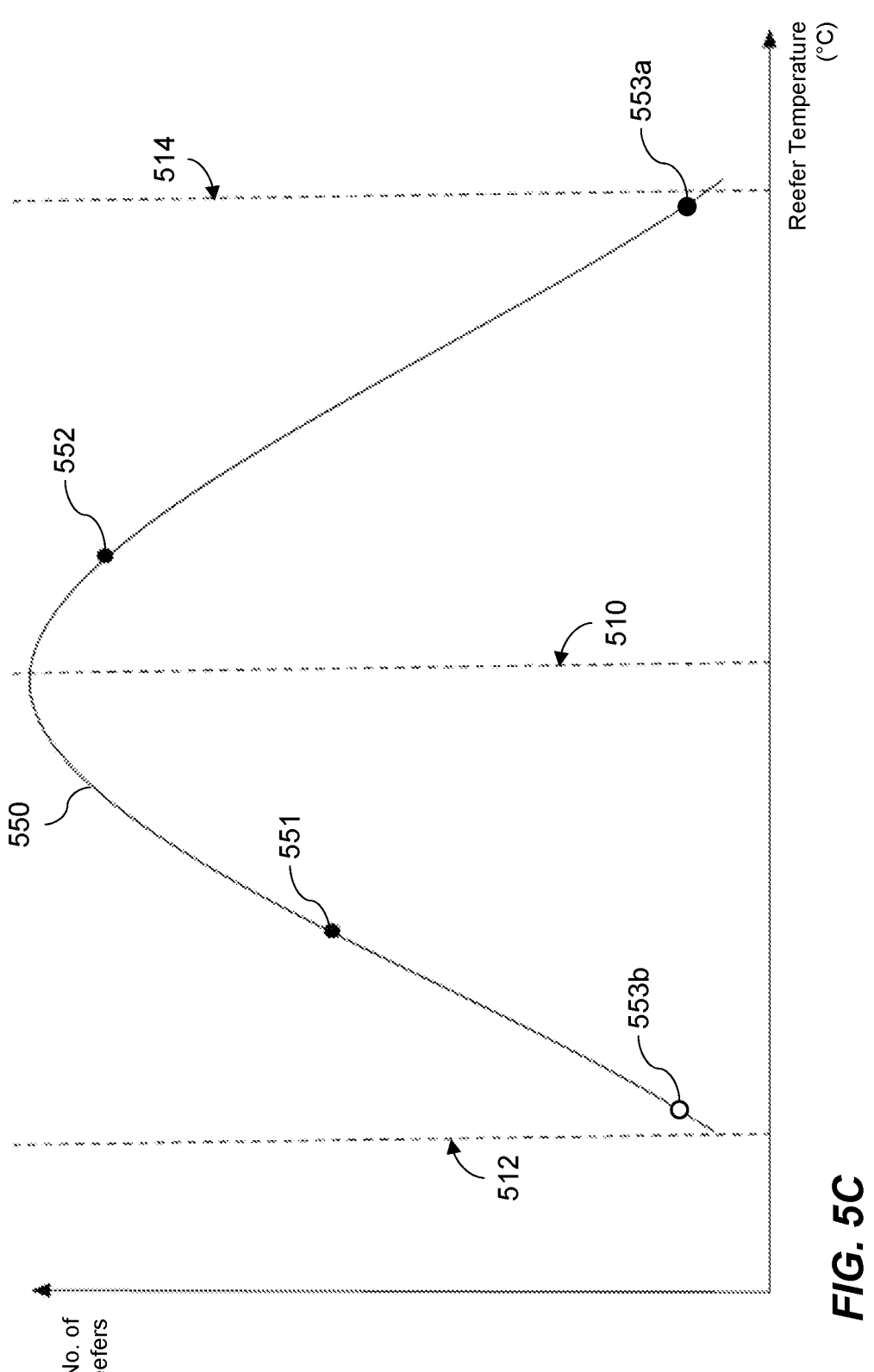

FIG. 5C shows another example temperature distribution 550 for a plurality of reefers. The reefers operate at a set temperature 510 with a predetermined tolerance that is symmetric about the set temperature 510, giving a set temperature range between a lower temperature 512 and an upper temperature 514. In other examples, the tolerance may be asymmetric about the set temperature 510, e.g. the sub range (of the set temperature range) between the lower temperature 512 and the set temperature 510 may be larger than the sub range between the set temperature 510 and the upper temperature 514, or vice versa. There are three points 551, 552, 553a labelled on the temperature distribution 550 which represent three respective reefers of the plurality of reefers. The reefer, represented by point 553a, operating at a temperature closest to the upper temperature 514 of the set temperature range is selected by the controller 110 for sub-cooling (e.g. routing excess energy to) thereby causing the refrigeration temperature of the reefer to drop. The sub-cooled reefer, represented by point 553b, operates at a temperature lower than the set temperature 510 for the plurality of reefers and closer to the lower temperature 512 of the set temperature range than the reefers represented by points 551, 552 and most of the reefers represented by the temperature distribution 550.

Additionally, or alternatively, the controller 110 may select the one or more reefers based on an external air temperature at the respective locations on the container vessel 1 of the one or more reefers, e.g. relative external air temperatures, at respective locations on the container vessel, of the reefer containers 130*a*, 130*b*, 130*c*, 130*d*, 130*e*. For example, the controller 110 may select those reefers that have the lowest differentials between the respective refrigeration temperatures and the surrounding air temperatures at the respective locations. In other cases, the controller 110 may determine to cool those reefers that have the lowest external air temperatures at their respective locations on the container vessel 1.

Additionally, or alternatively, the controller 110 may determine whether to cool at least one of the reefer containers 130 based on relative amounts of energy stored at, or being supplied to, the plurality of reefer containers 130*a*, 130*b*, 130*c*, 130*d*, 130*e*. For example, the controller 110 may select those reefers 130 which have the lowest amount of energy already stored thereat, the greatest amount of unused energy storage capacity, and/or the lowest amount of energy being supplied thereto. For example, the controller 110 may obtain dynamic operational data for the plurality of reefer containers 130*a*, 130*b*, 130*c*, 130*d*, 130*e* (e.g. as part of the reefer data previously described). The dynamic operational data may indicate an amount of energy being supplied to a given reefer container at a given time to keep the given reefer container at its set temperature, e.g. within its set temperature range. Thus, an operational profile for each reefer container in the plurality of reefer containers 130*a*, 130*b*, 130*c*, 130*d*, 130*e* may be determined based on the obtained dynamic operational data. The controller 110 may therefore determine whether to cool at least one of the reefer containers 130, e.g. select the one or more reefers, based on the dynamic operational data and/or operational profile for the one or more reefers, e.g. relative to the other reefer containers in the plurality of reefer containers 130*a*, 130*b*, 130*c*, 130*d*, 130*e*.

As described above, an efficiency of a given reefer in the plurality of reefer containers 130*a*, 130*b*, 130*c*, 130*d*, 130*e* may be determined based on the specifications (e.g. model type) and dynamic operational data for the given reefer. An expected performance of the given reefer can therefore be determined. The controller 110 may therefore determine whether to cool at least one of the reefer containers, e.g. select the one or more reefers to be sub-cooled, based on relative efficiencies, coefficients of performance (COP) of the reefer containers 130*a*, 130*b*, 130*c*, 130*d*, 130*e*, or expected performances of the reefer containers 130*a*, 130*b*, 130*c*, 130*d*, 130*e*. For example, the controller 110 may select for sub-cooling those reefers 130 that are the most energy efficient, since those reefers will warm the slowest and require the least energy to keep them sub-cooled.

Returning to the example where surplus energy generated by an onboard generator 120 is used to sub-cool the at least one reefer, FIG. 3B shows a specific case where a reefer, e.g. selected from the plurality of reefers 130*a*, 130*b*, 130*c*, 130*d*, 130*e*, is powered on and off in order to control the load on the generator 120 so that it falls within the target load range (shown in FIG. 3A). Switching on the reefer, e.g. such that it is powered to reach a target refrigeration temperature, increases the reefer load—and thus the total load—on the generator 120. Therefore, when the power controller determines that the generator load is going to fall, or has fallen, below the target load range—i.e. below the target load value minus Δ in the example of FIG. 3A—the reefer is switched on to increase the reefer load on the generator 120 so that the total generator load falls within the predetermined range of the target load value ±Δ. For example, for a reefer that contains refrigerated cargo, the controller can cause a 'start' signal to be sent to the reefer and allow the reefer to determine when to switch itself off, e.g. via the respective reefer controller, based on temperature data for example. Turning off the reefer such that no power is provided thereto decreases the reefer load—and thus the total load—on the generator 120. Therefore, when the controller determines that the generator load is going to rise, or has risen, above the target load range—i.e. above the target load value plus Δ in the example of FIG. 3A—the reefer is switched off to decrease the reefer load on the generator 120 such that the total generator load falls within the predetermined range of the target load value ±Δ.

Figure 4:
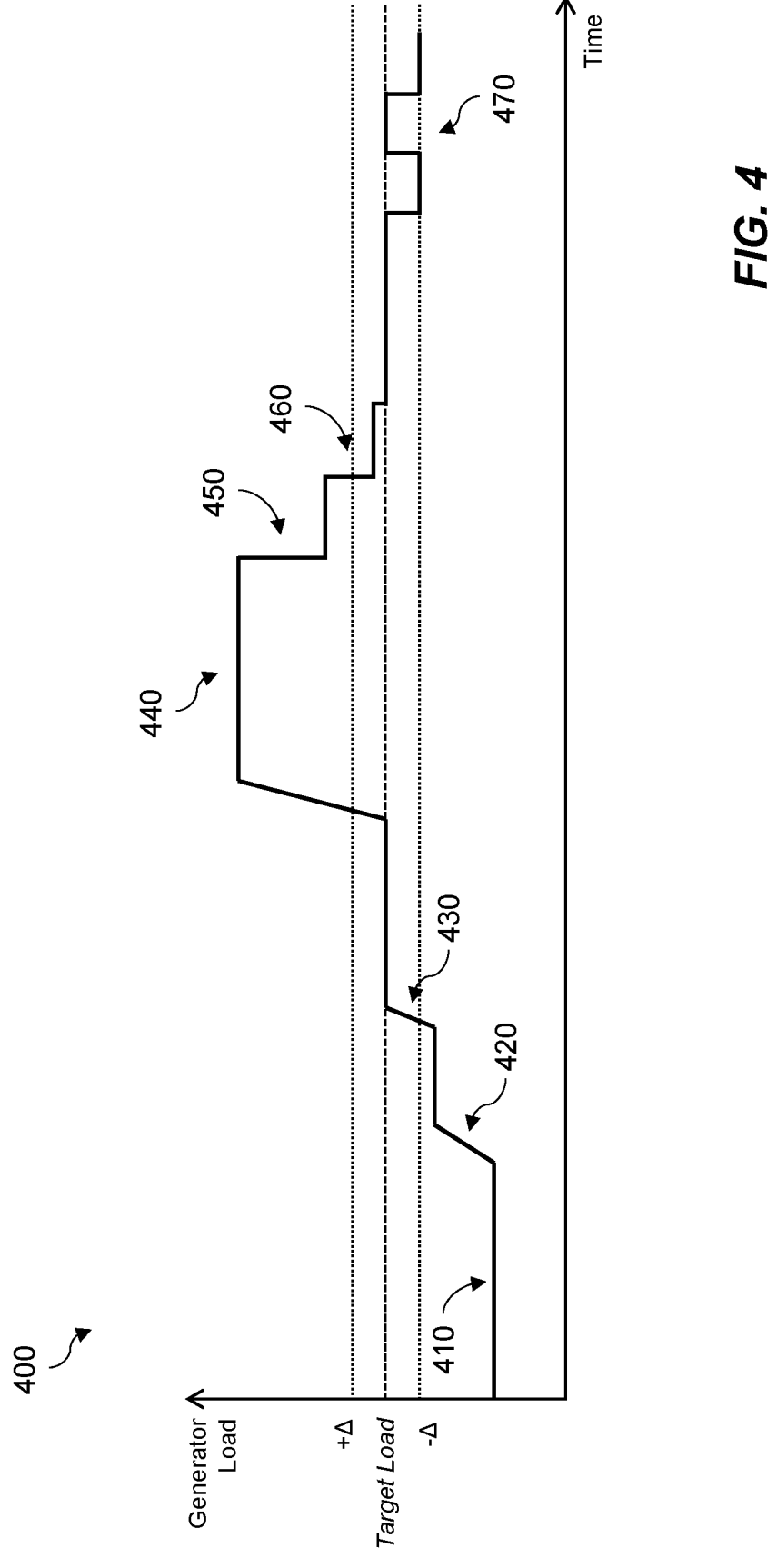
FIG. 4 shows a chart illustrating another example of managing a load on a generator.

FIG. 4 shows another example, corresponding to the example system shown in FIG. 1, wherein the load on the generator 120 is managed by the power control system 100 over time. Specifically, FIG. 4 shows a chart with time on the abscissa (x-axis) and the generator load on the ordinate (y-axis). The target load value for the generator 120 is represented as a dashed line intersecting the ordinate, and the target load range is represented as the range between the dotted lines intersecting the ordinate at −Δ and +Δ about the target load value. At section 410 of the chart, the generator 120 is operating at a load below the target load. At section 420, the generator load is increased by charging a battery 115 during the period of low demand on the generator 120. The battery 115 may be separate to the reefer containers 130 on the container vessel 1 and used to store excess energy generated by the generator 120 when the load is below the target load range which includes the target load; as shown in FIG. 4.

At section 430, it is determined that the generator load is below the target load and in response the controller 110 sends control signals to one or more power interfaces 105 supplying power to one or more reefers in order to cause sub-cooling of the reefer(s). In some examples, sub-cooling of the reefer(s) may only be allowed where the set temperature for the reefer(s) is below minus five (−5) degrees Celsius. Thus, the controller 110 routes excess energy to the power interface 105 for storage at the reefer(s) by sub-cooling the reefer(s). The generator load is thus further increased at section 430 by the controller causing sub-cooling of the one or more reefers, such that the generator load reaches the target load for the generator 120.

At section 440 of the chart, the demand (load) on the generator 120 has risen above the target load. In some examples, one or more batteries (e.g. the battery 115) may be used to cope with the period of high demand and/or another generator may be brought online. At section 450, the generator load is reduced by stopping charging of the battery 115 which was begun at section 420 previously. Selected reefers are sequentially switched off during section 460 until the generator load is reduced to the target load. In other examples, a set temperature range of one or more selected reefers may be adjusted, e.g. widened, thereby delaying the selected reefer(s) starting in order to reduce the generator load without switching the reefers off. As previously described, the reefers may be prioritised based on one or more possible factors in order to determine the order in which the reefers are selectively switched off. Through section 470, power switching of one or more reefers on the container vessel 1 is used to control the generator load such that it falls within the predetermined range, while also maintaining a refrigeration temperature (e.g. within a predetermined range, in order for the refrigerated cargo not to spoil).

Figure 6:
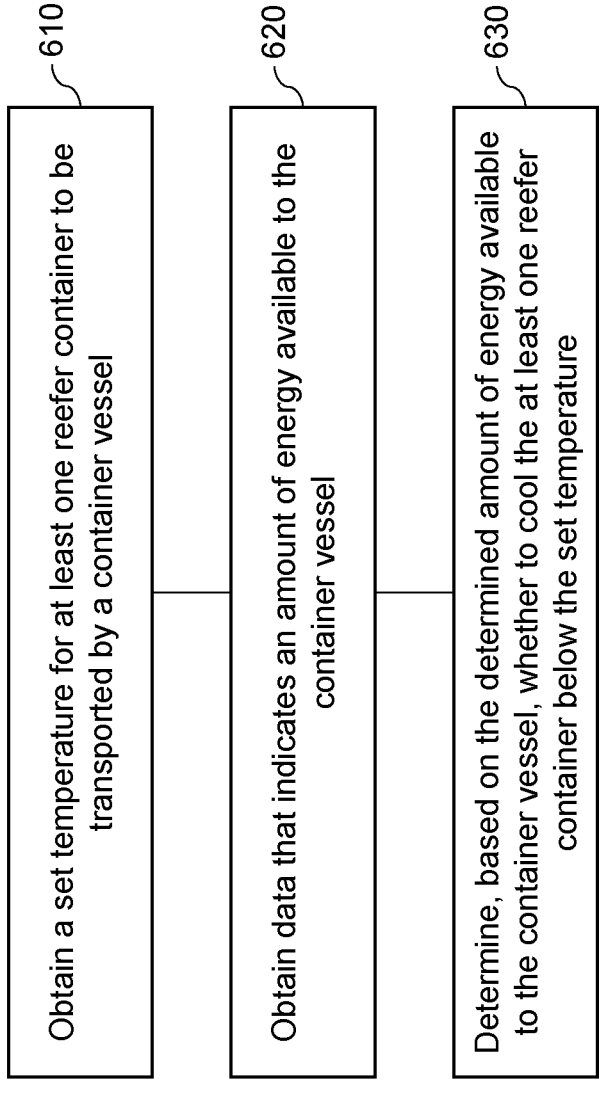
FIG. 6 shows a flow chart illustrating a method for a power control system of a marine vessel according to an example.

FIG. 6 shows a method 600 controlling power to be supplied to at least one reefer container on a container vessel according to an example. The method 600 comprises three blocks 610, 620 and 630.

At block 610, a set temperature for at least one reefer container to be transported by the container vessel is obtained. The set temperature for the at least one reefer container may be a programmed temperature based on the cargo to be carried by the reefer container, for example. As described, the at least one reefer container may be temperature controlled so that products, e.g. refrigerated cargo, stored within the at least one reefer container are not spoiled. For example, in a cold chain, certain products may require being maintained within a specified temperature range. The set temperature for the at least one reefer container carrying such cargo may thus correspond to the specified temperature range, which may be below freezing, e.g. for meat, fish, and other frozen foodstuff.

At block 620, data that indicates an amount of energy available to the container vessel is obtained. In some cases, the amount of energy available to the container vessel is determined. As described, the amount of energy available to the container vessel may include energy available from one or more power sources onboard the container vessel (e.g. a gen-set, a heat recovery system, a shaft generator, and/or an energy recovery turbine generator) and/or one or more power sources remote from the container vessel (e.g. shore power and/or a remote generator).

In some cases, obtaining data that indicates the amount of energy available to the container vessel includes obtaining data that indicates a current amount of energy available to the container vessel. For example, current or "live" status data may be obtained from the one or more power sources available to the container vessel, e.g. onboard or onshore. The live status data may indicate a respective amount of energy currently available from each of the power sources. Additionally, or alternatively, obtaining data that indicates the amount of energy available to the container vessel may comprise or include estimating an amount of energy that will be available to the container vessel at a future time. For example, based on status data from the one or more power sources available to the container vessel (e.g. a rate of energy currently being supplied, a capacity of energy stored in batteries etc.) and/or a planned amount of energy usage over a future time period (which may be based on navigation data, for example) the amount of energy that will be available to the container vessel at a future time, e.g. over the future time period, may be estimated.

At block 630, the method 600 involves determining, based on the amount of energy available to the container vessel, whether to cool the at least one reefer container below the set temperature. For example, this may involve determining whether to reduce the set temperature for the at least one reefer container. As described, the set temperature may be a target temperature value for the at least one reefer container to maintain, e.g. based on the cargo carried by the at least one reefer container. The method 600 may include determining whether to reduce the set temperature from a first set temperature to a second set temperature, for example. The second set temperature may be determined based on the amount of energy available to the container vessel, as described.

In examples, the set temperature comprises a set temperature range. The set temperature range may be based on predetermined lower and upper bounds of the temperature range. In other cases, a target temperature value may be predetermined, and the set temperature range may be derived from a tolerance applied to the target temperature value. For example, the tolerance may be a predetermined allowable amount of variation from the specified target temperature value, e.g. a predetermined number of degrees above or below the target temperature value. As described, the amount of tolerance may be symmetric about the target temperature value or asymmetric about the target temperature value, in which case different tolerance values for the upper and lower limits may be set respectively. For example, the tolerance may be +1 degree Celsius, −3 degrees Celsius, giving a lesser tolerance for reefer temperatures greater than the target temperature value.

In some cases, reducing the set temperature may involve shifting the set temperature range from a first set temperature range to a second set temperature range, e.g. reducing upper and lower bounds of the first set temperature range— as shown in FIG. 5A and described in examples above. In other cases, reducing the set temperature range may involve reducing the lower bound of the set temperature range, e.g. from a first lower bound to a second lower bound, without adjusting the upper bound of the set temperature range, thereby widening the set temperature range—as shown in FIG. 5B and described in examples above. Thus, the method may include determining, based on the amount of energy available to the container vessel, whether to reduce a lower bound of the set temperature range.

In some examples, the method 600 involves obtaining load data representative of a load on at least one generator of the container vessel. This may comprise receiving, retrieving or determining an amount of power that the generator is currently outputting, e.g. to components on the container vessel 1. In some examples, this may involve accumulating all partial loads currently on the generator, e.g. each partial load attributable to a different component of the vessel being powered by the generator. The load data may be obtained "live", e.g. while the generator is operating, to indicate a current load status for the generator. In examples, the load data may comprise a timeseries of power values recorded at predetermined time intervals.

Target load range data, representative of a predetermined (or "target") load range for the generator, may also obtained as part of the method 600. This may involve receiving, retrieving or determining a predetermined range of power values that the generator is intended to operate at. In examples, the target load range data may be retrieved from a memory, e.g. the same database which stores the load capacities of the generators on board the container vessel 1. In other examples, the target load range may be based on an efficiency of the generator, or of the engine component of the generator. For example, the target load range may be computed to be a load range on the generator that provides a peak efficiency of the generator (or specifically the engine component thereof). Such a determination may be made for each generator such that each generator has its own peak efficiency and associated target load range. In other examples, the target load range is determined based on an obtained target load value. For example, the target load value may be a pre-set value that does not change by which generator is being managed. For example, the target load may be set at 85% of the maximum generator load, regardless of which specific generator is being managed.

As described above, the amount of energy available to the container vessel may comprise surplus energy corresponding to a difference between the load on the at least one generator and a lower bound of the target load range for the generator. In such cases, the method 600 may involve cooling the at least one reefer container below the set temperature by an amount determined to cause the load to increase to a load within the target load range. In examples, the load on the generator is controlled such that the load falls within the target load range by routing excess energy, generated by the generator when the load is below the target load range, for storage at the at least one reefer container transportable by the container vessel.

In some examples, the load is controlled to fall within the target load range by controlling energy stored at the at least one reefer container when the load is above the target load range. For example, by reducing the reefer load, e.g. utilising or "releasing" energy previously stored as thermal energy at the reefer containers when the generator operated at a load below the target load range, the power demands of the components supplied by the generator can be met while the total load on the generator is reduced. As described, controlling energy stored at the reefer container(s), e.g. via a power interface arranged to supply power to the reefer container(s), may comprise reducing the amount of energy supplied to the reefer container(s). For example, the amount of energy being routed to the power interfaces for supplying power to the one or more reefers may be reduced while keeping the operating temperature of the one or more reefers within the set temperature range for the one or more reefers, e.g. by selecting reefers that have been sub-cooled to reduce the amount of energy supplied thereto. This can reduce the energy demand of the one or more reefers on the generator and so can contribute to the total load of the generator being brought within the target load range about the target load value. In certain cases, reducing energy supplied to a given reefer involves stopping the supply of energy to the given reefer, e.g. switching off the power supply to the given reefer. This might be done at the power interface for the given reefer, for instance, or at the power controller which controls the power supply routed to the one or more power interfaces.

In certain cases, as well as the amount of energy available to the container vessel, determining whether to cool the at least one reefer container may be based on at least one other criterion. For example, as described in examples relating to the power controller, the at least one other criterion may include at least one of a location on the container vessel of the at least one reefer container, a model type of the at least one reefer container, an amount of energy being supplied to the at least one reefer container, a type of product contained within the at least one reefer container, a current internal temperature of the at least one reefer container, and an external air temperature at the location on the container vessel of the at least one reefer container.

The at least one reefer container may include multiple reefer containers. In such cases, the method 600 may involve determining whether to cool at least one of the reefer containers below a respective set temperature. For example, different reefers may have different set temperatures, e.g. depending on the goods that each one is to transport. As described in examples above relating to the power controller, the determination of whether to cool at least one of the reefer containers may be based on relative internal temperatures of the reefer containers, relative external air temperatures (at respective locations on the container vessel) of the reefer containers, relative locations on the container vessel of the reefer containers, relative coefficients of performance of the reefer containers, and/or relative amounts of energy being supplied to the reefer containers.

Any of the example methods described herein may be encoded in machine-readable instructions that can be carried out by a processor or a controller, e.g. a power controller for a container vessel. For example, a non-transitory machine-readable storage medium may be provided which stores instructions that, when executed by a controller, cause the controller to carry out the method 600 or any example extension thereof.

As described in examples herein, sub-cooling reefer containers to be transported by a container vessel can allow for a period of time where a lower amount of energy can be supplied to the sub-cooled reefer, without the internal temperature rising above a predetermined temperature, e.g. maximum temperature value, set according to the goods contained therein. Thus, by storing energy as thermal energy in the sub-cooled reefers in this way, the reefer load on the power supply systems can subsequently be reduced meaning less fuel can be consumed as the sub-cooled reefers warm up slowly. In turn, while less fuel is being burned by the vessel, emissions from the vessel may be lowered, which may help the vessel comply with emissions regulations while in an ECA, for example.

Sub-cooling reefers can also allow surplus energy generated onboard the vessel, to be converted into thermal energy at the sub-cooled reefers and stored, e.g. like a one-way thermo-battery. Additionally, or alternatively, before departing from port to sea, shore supply may be utilised to sub-cool one or more reefers to be transported by the container vessel so that the thermal energy stored in the one or more subcooled reefers may be recouped later while at sea, e.g. by reducing the reefer load as described in various examples.

Further, sub-cooling reefers can allow a load for a generator onboard the container vessel to be controlled to fall within a target load range, e.g. based on an efficiency of the generator. By smoothing up- and down-surges in the generator load, to maintain the load within the target load range fuel usage of the generator can be reduced, in a similar way to how cruise control for a motor vehicle helps reduce fuel consumption. By setting the target load for the generator based on an efficiency of the generator, e.g. selecting a target load corresponding to peak efficiency of the generator, the actual operating efficiency of the generator can be improved which can further help to reduce fuel consumption of the generator, and thus of the container vessel; in turn reducing pollution levels.

The above embodiments are to be understood as illustrative examples. Further embodiments are envisaged. It should be noted that although each example has been described individually, features from each example may be combined, features of one example may be combined with features of one or more other examples. Examples of the present invention have been discussed. However, it will be appreciated that variations and modifications may be made to the examples described, without departing from the scope of the invention as defined by the appended claims.

What is claimed is:

1. A power controller for controlling power to be supplied to at least one reefer container on a container vessel, the power controller configured to:

obtain a set temperature for the at least one reefer container to be transported by the container vessel;

obtain data that indicates an amount of energy available to the container vessel, wherein the amount of energy available to the container vessel comprises surplus energy that exceeds energy demands of the container vessel;

determine, based on the surplus energy, whether to cool the at least one reefer container below the set temperature; and cause the at least one reefer container to be cooled below the set temperature when the determination is to cool the at least one reefer container, wherein the amount of energy available to the container vessel comprises energy available from:

one or more power sources onboard the container vessel; and/or one or more power sources remote from the container vessel.

2. The power controller according to claim 1, wherein the one or more power sources onboard the container vessel comprise one or more of:

a heat recovery system located to receive exhaust gases emitted from one or more engines of the container vessel;

a shaft generator coupled to a propeller shaft of the container vessel; and an energy recovery turbine generator located to receive wastewater from an exhaust gas treatment unit onboard the container vessel.

3. The power controller according to claim 1, wherein the power controller is configured to obtain:

load data representative of a load on at least one generator of the container vessel; and target load data representative of a target load range for the at least one generator;

wherein the surplus energy corresponds to a difference between the load on the at least one generator and a lower bound of the target load range for the generator, wherein the power controller is configured to cool the at least one reefer below the set temperature by an amount determined so as to cause the load to increase to a load within the target load range.

4. The power controller according to claim 1, wherein the power controller is configured to determine whether to cool the at least one reefer container based on the amount of energy available to the container vessel and at least one other criterion, wherein the at least one other criterion comprises at least one of:

a location on the container vessel of the at least one reefer container;

a model type of the at least one reefer container;

an amount of energy being supplied to the at least one reefer container;

a type of product contained within the at least one reefer container;

a current internal temperature of the at least one reefer container;

a coefficient of performance of the at least one reefer container; and an external air temperature at the location on the container vessel of the at least one reefer container.

5. The power controller according to claim 1, wherein the at least one reefer container comprises plural reefer containers, and wherein the power controller is configured to determine whether to cool at least one of the reefer containers, below a respective set temperature, based on at least one of:

relative internal temperatures of the reefer containers;

relative external air temperatures, at respective locations on the container vessel, of the reefer containers;

relative locations on the container vessel of the reefer containers;

relative coefficients of performance of the reefer containers; and relative amounts of energy being supplied to the reefer containers.

6. The power controller according to claim 1, wherein the power controller being configured to determine whether to cool the at least one reefer container below the set temperature comprises the power controller being configured to determine whether to reduce the set temperature for the at least one reefer container, wherein the set temperature comprises a set temperature range, and wherein the power controller is configured to determine, based on the amount of energy available to the container vessel, whether to reduce a lower bound of the set temperature range.

7. The power controller according to claim 6, wherein the power controller is configured to determine whether to reduce the set temperature from a first set temperature to a second set temperature, wherein the second set temperature is determined based on the amount of energy available to the container vessel.

8. The power controller according to claim 1, wherein the power controller is located:

on the container vessel; or remote from the container vessel.

9. A method for controlling power to be supplied to at least one reefer container on a container vessel, the method comprising:

obtaining a set temperature for the at least one reefer container to be transported by the container vessel;

obtaining data that indicates an amount of energy available to the container vessel, wherein the amount of energy available to the container vessel comprises surplus energy that exceeds energy demands of the container vessel;

determining, based on the surplus energy, whether to cool the at least one reefer container below the set temperature; and causing the at least one reefer container to be cooled below the set temperature when the determination is to cool the at least one reefer container, wherein the amount of energy available to the container vessel comprises energy available from:

one or more power sources onboard the container vessel; and/or one or more power sources remote from the container vessel.

10. The method according to claim 9, comprising:

obtaining load data representative of a load on at least one generator of the container vessel;

obtaining target load data representative of a target load range for the at least one generator, wherein the surplus energy corresponds to a difference between the load on the at least one generator and a lower bound of the target load range for the generator; and cooling the at least one reefer container below the set temperature by an amount determined so as to cause the load to increase to a load within the target load range.

11. The method according to claim 9, the method comprising:

determining whether to cool the at least one reefer container based on the amount of energy available to the container vessel and at least one other criterion, wherein the at least one other criterion comprises at least one of:

a location on the container vessel of the at least one reefer container;

a model type of the at least one reefer container;

an amount of energy being supplied to the at least one reefer container;

a type of product contained within the at least one reefer container;

a current internal temperature of the at least one reefer container;

a coefficient of performance of the at least one reefer container; and an external air temperature at the location on the container vessel of the at least one reefer container.

12. The method according to claim 11, wherein the at least one reefer container comprises plural reefer containers, and wherein the method comprises determining whether to cool at least one of the reefer containers, below a respective set temperature, based on at least one of:

relative internal temperatures of the reefer containers;

relative external air temperatures, at respective locations on the container vessel, of the reefer containers;

relative locations on the container vessel of the reefer containers;

relative coefficients of performance of the reefer containers; and relative amounts of energy being supplied to the reefer containers.

13. The method according to claim 9, wherein the determining whether to cool the at least one reefer container comprises determining whether to reduce the set temperature for the at least one reefer container, wherein the set temperature comprises a set temperature range, and wherein the method comprises determining, based on the amount of energy available to the container vessel, whether to reduce a lower bound of the set temperature range.

14. The method according to claim 13, comprising:

determining whether to reduce the set temperature from a first set temperature to a second set temperature, wherein the second set temperature is determined based on the amount of energy available to the container vessel.

15. The method according to claim 9, wherein the obtaining data that indicates the amount of energy available to the container vessel comprises at least one of:

obtaining data that indicates a current amount of energy available to the container vessel; and estimating an amount of energy that will be available to the container vessel at a future time.

16. A non-transitory machine-readable storage medium storing instructions that, when executed by a controller, cause the controller to:

obtain a set temperature for the at least one reefer container to be transported by the container vessel;

obtain data that indicates an amount of energy available to the container vessel, wherein the amount of energy available to the container vessel comprises surplus energy that exceeds energy demands of the container vessel;

determine, based on the surplus energy, whether to cool the at least one reefer container below the set temperature; and cause the at least one reefer container to be cooled below the set temperature when the determination is to cool the at least one reefer container, wherein the amount of energy available to the container vessel comprises energy available from:

one or more power sources onboard the container vessel; and/or one or more power sources remote from the container vessel.

* * * * *